US008304064B2

(12) United States Patent
Takeyama et al.

(10) Patent No.: US 8,304,064 B2

(45) Date of Patent: Nov. 6, 2012

(54) STRETCH-FORMED SHEET OF ULTRA-HIGH MOLECULAR WEIGHT POLYOLEFIN HAVING EXCELLENT TRANSPARENCY AND MECHANICAL PROPERTIES, AND PRODUCTION METHOD THEREOF

(75) Inventors: Hidenobu Takeyama, Tokyo (JP); Minoru Mayama, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 692 days.

(21) Appl. No.: 12/308,873

(22) PCT Filed: Jun. 26, 2007

(86) PCT No.: PCT/JP2007/062805

§ 371 (c)(1),
(2), (4) Date: Jan. 29, 2009

(87) PCT Pub. No.: WO2008/001772

PCT Pub. Date: Jan. 3, 2008

(65) Prior Publication Data

US 2009/0324920 A1 Dec. 31, 2009

(30) Foreign Application Priority Data

Jun. 27, 2006 (JP) ................................ 2006-177128

(51) Int. Cl.
*B32B 27/32* (2006.01)

(52) U.S. Cl. ......... 428/220; 264/165; 264/175; 526/352

(58) Field of Classification Search .................. 428/220; 264/165, 175; 526/352
See application file for complete search history.

(56) References Cited

U.S. PATENT DOCUMENTS

| | | | |
|---|---|---|---|
| 5,034,480 | A | 7/1991 | Funk et al. |
| 5,034,481 | A | 7/1991 | Funk et al. |
| 5,115,067 | A | 5/1992 | Yagi et al. |
| 2006/0287449 | A1 | 12/2006 | Miyamoto et al. |

FOREIGN PATENT DOCUMENTS

| | | | | |
|---|---|---|---|---|
| JP | S60-228122 | A | | 11/1985 |
| JP | S60-255415 | A | | 12/1985 |
| JP | S63-275708 | A | | 11/1988 |
| JP | S63-275709 | A | | 11/1988 |
| JP | S63-275710 | A | | 11/1988 |
| JP | S63-275711 | A | | 11/1988 |
| JP | H02-142805 | A | | 5/1990 |
| JP | H02-142806 | A | | 5/1990 |
| JP | H05-086803 | A | | 4/1993 |
| JP | H06-091747 | A | | 4/1994 |
| JP | 06136150 | A | * | 5/1994 |
| JP | H06-136150 | A | | 5/1994 |
| JP | H07-164461 | A | | 6/1995 |
| JP | H10-323892 | A | | 12/1998 |
| JP | H11-147246 | A | | 6/1999 |
| JP | 3491835 | B | | 11/2003 |
| JP | 2006-001098 | A | | 1/2006 |
| WO | WO 2004/081064 | A1 | | 9/2004 |

* cited by examiner

*Primary Examiner* — Robert D. Harlan

(74) *Attorney, Agent, or Firm* — Morgan, Lewis & Bockius LLP

(57) ABSTRACT

To provide a stretch-formed sheet of ultra-high molecular weight polyolefin having excellent transparency and mechanical properties, while being relatively thick. A stretch-formed sheet of ultra-high molecular weight polyolefin having a thickness of 0.2 mm or greater and having an internal haze of 70% or less in the direction of the thickness, is prepared by stretching at least in one direction a formed article of ultra-high molecular weight olefin having a density of 925 kg/$m^3$ or less and containing a polymer of ultra-high molecular weight polyolefin having an intrinsic viscosity of 7 dl/g or greater as measured in a 135° C. decalin solution, at a temperature of less than the melting point (Tm) of the ultra-high molecular weight polyolefin and at ordinary temperature or higher.

14 Claims, No Drawings

STRETCH-FORMED SHEET OF ULTRA-HIGH MOLECULAR WEIGHT POLYOLEFIN HAVING EXCELLENT TRANSPARENCY AND MECHANICAL PROPERTIES, AND PRODUCTION METHOD THEREOF

BACKGROUND

The present invention relates to a stretch-formed sheet of ultra-high molecular weight polyolefin having excellent transparency and mechanical properties, and to a production method thereof; in particular, it relates to a stretch-formed sheet of ultra-high molecular weight polyolefin, which can be industrially produced, is relatively thick, and has excellent transparency and mechanical properties, and to a production method thereof.

Compared to high molecular weight polyolefin used in general, formed articles of ultra-high molecular weight polyolefin represented by ultra-high molecular weight polyethylene, or the like, have excellent mechanical properties, such as, impact resistance, abrasion resistance, low coefficient of friction and tensile strength, and resistance to chemicals. Taking advantage of such characteristics, formed articles of ultra-high molecular weight polyolefin are used in mechanical parts such as gears, pulleys or sprockets, in various linings of guide rails or hopper tank lining materials, and the like.

Meanwhile, since molten viscosity is extremely high and fluidity is poor for ultra-high molecular weight polyolefins compared to polyethylene used in general, which makes forming by extrusion molding and injection molding extremely difficult, there is the disadvantage that forming processes are difficult. Therefore, compression molding, or the like, has been adopted in general as a forming method for ultra-high molecular weight polyethylene, and as part of others, a method has been adopted, called ram extrusion molding, in which molding is under the condition of extremely low molding speed, in order to obtain rod-shaped formed products.

In addition, ski sole or the like exists as one application of ultra-high molecular weight polyethylene, and sheet material applications requiring this type of high mechanical properties are thought to be ones that will take advantage of the characteristics that an ultra-high molecular weight polyethylene has.

In recent years, in this type of application, sheets having excellent transparency are sought, with the purpose of increasing designability of letters, drawings and the like drawn on the bottom of a ski sole, for instance. However, formed article obtained from crystalline resin of polyolefin represented by polyethylene, in general, is in a poorly transparent cloudy state, the formed article per se being white. That is to say, the current situation is that nothing fulfilling sufficiently the performance regarding transparency has been obtained yet.

Many films, sheets, pipes, and the like, using low density polyethylene have been reported so far in prior art as formed articles of polyethylene having excellent transparency, achieving high transparency. However, sufficient effects on the point of mechanical properties such as abrasion resistance and impact resistance cannot be expected from those using low density polyethylene, as the molecular weight is lower compared to ultra-high molecular weight polyethylene.

Meanwhile, as ultra-high molecular weight polyethylene having low density, in general, those in which ethylene and α-olefin have been copolymerized are known, and a low density ultra-high molecular weight polyethylene is disclosed, for instance, in Patent Reference 1. However, the low density ultra-high molecular weight polyethylene described in Patent Reference 1, has a comparatively high proportion of degree of crystallinity with respect to density, and is not sufficient in terms of transparency.

In addition, even if they have the same transparency, formed articles of ultra-high molecular weight polyethylene having higher density and degree of crystallinity are desired. That is to say, if the density is decreased to lower the degree of crystallinity in order to increase transparency, mechanical properties of this formed article, such as, tensile yield strength, modulus of elongation and flexural strength decrease, which is not desirable.

Here, in order to improve transparency, it is possible to copolymerize a greater number of comonomers such as α-olefin to decrease the density further. However, from such reasons as the molecular weight decreases while the copolymerization reaction between ethylene and α-olefin progresses and the density decreases, obtaining an ultra-high molecular weight polyethylene having a high molecular weight and a low density is extremely difficult by such improvements. Moreover, copolymerizing a greater number of comonomers such as α-olefin is not only uneconomical, mechanical properties such as stiffness decrease remarkably along with the decrease in the density. Therefore, obtaining a sufficient performance comprising high transparency and mechanical properties is not possible by such methods.

Meanwhile, a method for transparentization is known, whereby the degree of crystallinity is reduced by rapidly cooling after melting. For instance, disclosed in Patent Reference 2 is a production method for a sheet in which the density in a coating material for a ski using an ultra-high molecular weight polyethylene has been lowered by cooling rapidly after re-melting the formed article. However, the strip material containing the ultra-high molecular weight polyethylene described in Patent Reference 2 had originally a high density and an insufficient transparency in the formed article. In addition, in such a method there are technical limitations to lower the density by further cooling rapidly to improve transparency. Moreover, as this method requires cumbersome steps such as carrying out heat treatment again in a subsequent step, then cooling rapidly, it is not economical.

In addition, in prior art, methods such as rolling and drawing are adopted as means for stretching polyethylene material in general, and, disclosed in Patent References 3 to 5, for instance, are methods in which rolling, drawing, and the like, are carried out with the purpose of reducing slidability and abrasion, surface smoothness and low coefficient of friction. In addition, disclosed in Patent Reference 6 is a production method for preparing a high density polyethylene sheet having improved transparency and mechanical properties by heat compressing and then re-drawing high density polyethylene.

Meanwhile, techniques for stretching polyethylene materials having a low molecular weight to a high degree are already in practical use in the technical domains of films and strings, and there is transparent polyethylene as a representative example thereof. However, regarding mechanical properties and the like, nothing has been obtained that would satisfy performance as sufficiently as formed articles of ultra-high molecular weight polyethylene, owing to the low molecular weight. For instance, disclosed in Patent Reference 7 is a production method for preparing a highly strong sheet-shaped product having excellent transparency by rolling. However, due to the sheet-shaped product of Patent Reference 7 having a low molecular weight, mechanical properties such as abrasion resistance and impact resistance are not sufficient.

Meanwhile, disclosed in Patent Reference 8 and 9 are production methods for preparing a highly strong polyethylene ultra-thin film having excellent transparency by biaxially drawing a gel-state sheet with a high drawing factor. However, with the methods disclosed in Patent Reference 8 and 9, cumbersome steps are required in order to prepare the gel-state sheet, such as solvent removing process and heat-pressurizing process to transparentize the multipored opaque draw-formed product, which is not economical. Moreover, as they are for preparing ultra-thin film on the order of several μm to 10 and several μm by biaxially drawing a gel-state sheet with a high drawing factor, obtaining a sheet having excellent transparency with a thickness of on the order of several hundreds of μm or greater is not possible.

In addition, disclosed in Patent Reference 10 as methods for drawing an ultra-high molecular weight polyethylene to a high degree are methods in which biaxial drawing is carried out in the presence of a plasticizer (flow improver). However, it is supposed that with this method, thick product having excellent transparency cannot be obtained, due to holes appearing after plasticizer extraction and the product becoming multipored, giving rise to light scattering caused by this porosity.

Patent Reference 1: National Publication of Translated version No. H5-86803

Patent Reference 2: Japanese Patent Publication No. 3491835

Patent Reference 3: Japanese Patent Application Laid-open No. 2006-001098

Patent Reference 4: Japanese Patent Application Laid-open No. H11-147246

Patent Reference 5: Japanese Patent Application Laid-open No. H6-91747

Patent Reference 6: Japanese Patent Application Laid-open No. H10-323892

Patent Reference 7: Japanese Patent Application Laid-open No. H7-164461

Patent Reference 8: Japanese Patent Application Laid-open No. S60-228122

Patent Reference 9: Japanese Patent Application Laid-open No. S60-255415

Patent Reference 10: Japanese Patent Application Laid-open No. H6-136150

As described above, from the excellent mechanical properties thereof, the formed article of ultra-high molecular weight polyolefin has been studied for numerous diverse applications; however, nothing has been obtained that has an entirely novel function responding to new requirements from the industry and new requirements from the marked, which are changing vertiginously.

In particular, polyolefin, which is a crystalline resin, behaves very differently from other non-crystalline resins in terms of properties such as transparency and contractility. Consequently, if such a novel function could be achieved, specifically, if a formed article of ultra-high molecular weight polyolefin having excellent transparency and mechanical properties while being relatively thick could be realized, new applications are anticipated to spread.

However, owing to the height of the molecular weight thereof, a polymer of ultra-high molecular weight polyolefin entangles strongly, narrowing the broadness of material selection and the degree of freedom of the production process (process margin) in contrast to low molecular weight polyolefin, high density polyethylene and the like, such that a thick product provided with both functions of transparency and mechanical properties could not be realized.

SUMMARY

The present invention was devised to solve the issued described above, and an object thereof is to provide a stretch-formed sheet of ultra-high molecular weight polyolefin having excellent transparency and mechanical properties, while being relatively thick. In addition, another object of the present invention is to provide a production method having excellent productivity, capable of producing such stretch-formed sheet of ultra-high molecular weight polyolefin, simply and without requiring cumbersome steps.

As a result of earnest studies to solve the above issues, the present authors discovered that by balancing all the physical properties of the source material and the processing conditions, that is to say, using a specific ultra-high molecular weight polyolefin to obtain a formed article of ultra-high molecular weight polyolefin, which is further stretched under specific conditions, a stretch-formed sheet of ultra-high molecular weight polyolefin having exceptionally excellent transparency and mechanical properties while being relatively thick could be obtained, and reached completion of the present invention.

That is to say, the present invention provides (1) to (11) below:

(1) A stretch-formed sheet of ultra-high molecular weight polyolefin having a thickness of 0.2 mm or greater and having an internal haze of 70% or less in the direction of the thickness, which is obtainable by stretching at least in one direction a formed article of ultra-high molecular weight olefin having a density of 925 kg/m$^3$ or less and containing a polymer of ultra-high molecular weight polyolefin having an intrinsic viscosity of 7 dl/g or greater as measured in a 135° C. decalin solution.

(2) The stretch-formed sheet of ultra-high molecular weight polyolefin as described in (1), wherein the heat shrinkage rate (γ) represented by the following Formula (1) is 5% or greater in at least one of a direction MD along which stretching is carried out and a direction TD perpendicular to the stretching direction:

$$\gamma(\%)=100\times(L0-L)/L0 \qquad \text{Formula (1)}$$

γ: heat shrinkage rate

L0: initial length of stretch-formed sheet

L: length of stretch-formed sheet after state adjustment at 120° C. for 30 minutes.

(3) The stretch-formed sheet of ultra-high molecular weight polyolefin as described in (1) or (2), wherein the polymer of ultra-high molecular weight polyolefin comprises a copolymer of ethylene and α-olefin having 3 to 10 carbons.

(4) The stretch-formed sheet of ultra-high molecular weight polyolefin as described in (3), wherein the polymer of ultra-high molecular weight polyolefin has a content of the α-olefin of 0.01 mol % or greater but less than 1 mol %.

(5) The stretch-formed sheet of ultra-high molecular weight polyolefin as described in any one from (1) to (4), wherein the internal haze is 70% or less in the thickness direction when converted to a thickness of 2 mm.

(6) The stretch-formed sheet of ultra-high molecular weight polyolefin as described in any one from (1) to (5), obtained by stretching the formed article of ultra-high molecular weight polyolefin by a stretch ratio (χ) of 1.3-times or greater represented by the following Formula (2):

$$\chi=t1/t2 \qquad \text{Formula (2)}$$

t1: thickness prior to stretching (mm)

t2: thickness after stretching (mm).

(7) A production method of a stretch-formed sheet of ultra-high molecular weight polyolefin, comprising: a step of preparing a formed article of ultra-high molecular weight polyolefin having a density of 925 kg/m$^3$ or less and containing a polymer of ultra-high molecular weight polyolefin having an intrinsic viscosity of 7 dl/g or greater as measured in a 135° C. decalin solution; and a step of stretching the formed article of ultra-high molecular weight polyolefin in at least one direction at a temperature of less than the melting point (Tm) of the ultra-high molecular weight polyolefin and at ordinary temperature or higher, to prepare a stretch-formed sheet having a thickness of 0.2 mm or greater and an internal haze of 70% or less in the direction of the thickness.

(8) The production method of a stretch-formed sheet of ultra-high molecular weight polyolefin as described in (7), wherein the formed article of ultra-high molecular weight polyolefin is stretched by any means among, rolling, drawing and compression.

(9) The production method of a stretch-formed sheet of ultra-high molecular weight polyolefin as described in (7), wherein the formed article of ultra-high molecular weight polyolefin is stretched by rolling.

(10) The production method of a stretch-formed sheet of ultra-high molecular weight polyolefin as described in any one from (7) to (9), wherein the formed article of ultra-high molecular weight polyolefin is stretched by a stretch ratio (χ) of 1.3-times or greater represented by the following Formula (2):

$$\chi = t1/t2 \quad \text{Formula (2)}$$

t1: thickness prior to stretching (mm)

t2: thickness after stretching (mm).

(11) A stretch-formed sheet of ultra-high molecular weight polyolefin, containing a polymer of ultra-high molecular weight polyolefin which comprises a copolymer of ethylene and α-olefin having 3 to 10 carbons, and having a content of the α-olefin of 0.01 mol % or greater but less than 1 mol %, having a thickness of 0.2 mm or greater, an internal haze of 70% or less in the thickness direction, and a heat shrinkage rate (γ) represented by the following Formula (1) of 5% or greater in one of a direction MD along which stretching is carried out and a direction TD perpendicular to the stretching direction:

$$\gamma(\%) = 100\times(L0-L)/L0 \quad \text{Formula (1)}$$

γ: heat shrinkage rate

L0: initial length of stretch-formed sheet

L: length of stretch-formed sheet after state adjustment at 120° C. for 30 minutes.

According to the stretch-formed sheet of ultra-high molecular weight polyolefin of the present invention, transparency and mechanical properties are excellent despite the thickness compared to prior art, employment is possible in various applications where a high degree of mechanical properties is required, and moreover, designability can be raised. In addition, the production method of the present invention has excellent productivity and is economical, since, compared to prior art, it allows a formed sheet from the article of stretch-formed ultra-high molecular weight polyolefin of the present invention to be produced simply and at low cost without requiring cumbersome steps.

DETAILED DESCRIPTION

Hereinafter, an embodiment of the present invention will be described. Note that the present invention is not limited solely to this embodiment and that it can be carried out in a variety of modes as long as they do not depart from the spirit of the invention.

The stretch-formed sheet of ultra-high molecular weight polyolefin of the present embodiment is obtainable by stretching at least in one direction a formed article of ultra-high molecular weight olefin having a density of 925 $kg/m^3$ or less and containing a polymer of ultra-high molecular weight polyolefin having an intrinsic viscosity of 7 dl/g or greater as measured in a 135° C. decalin solution.

That is to say, the present embodiment is one for obtaining a stretch-formed sheet of ultra-high molecular weight polyolefin having excellent transparency and excellent mechanical properties by using a specific polymer of ultra-high molecular weight polyolefin to obtain a formed article of ultra-high molecular weight polyolefin, which is further stretched under specific conditions.

(Polymer of Ultra-High Molecular Weight Polyolefin)

As concrete examples of ultra-high molecular weight polyolefin polymer, for instance, homopolymer of ethylene, homopolymer of propylene, or, copolymer of ethylene or propylene and α-olefin having 3 to 10 carbons, and the like, may be cited. Here, as concrete examples of α-olefin having 3 to 10 carbons, for instance, propylene, 1-butene, 4-methyl-1-pentene, 1-pentene, 1-hexene, 1-octene, 1-decene, and the like, may be cited. Among these, from the point of view of economic efficiency or the like, a homopolymer of ethylene, or a copolymer with the above α-olefin in which ethylene is the main component is used preferentially as the polymer of ultra-high molecular weight polyolefin, and in particular, a copolymer in which a comonomer such as α-olefin or the like has been introduced as a branch into ethylene is used preferentially.

The polymer of ultra-high molecular weight polyolefin can be produced by well known prior art methods; for instance, it can be obtained by (co)polymerizing the source material compounds thereof by slurry polymerization method, gas phase polymerization method, or the like. Here, in the slurry polymerization method, an inactive hydrocarbon medium can be used as the medium; furthermore, olefin per se can also be used as the solvent. As concrete examples of such inactive hydrocarbon medium, for instance, aliphatic hydrocarbons such as propane, butane, isobutane, pentane, isopentane, hexane, heptane, octane, decane, dodecane and kerosene; alicyclic hydrocarbons such as cyclopentane, cyclohexane, and methyl cyclopentane; aromatic hydrocarbons such as benzene, toluene and xylene; halogenated hydrocarbons such as ethyl chloride, chlorbenzene and dichloromethane, and mixtures thereof, and the like, can be cited.

Although the polymer of ultra-high molecular weight polyolefin can be produced by well known prior art methods as described above, among those obtained in this way used in the present embodiment are those having an intrinsic viscosity of 7 dl/g or greater as measured in a 135° C. decalin solution. If those having an intrinsic viscosity of less than 7 dl/g are used, there is the tendency that high performance in mechanical properties such as abrasion resistance and impact resistance is difficult to obtain. Such the intrinsic viscosity is preferably 10 dl/g or greater, and more preferably 14 dl/g or greater. Although the upper limit of the intrinsic viscosity is not limited in particular, it is preferably less than 30 dl/g. It is anticipated that, if the intrinsic viscosity becomes 30 dl/g or greater, the interface between powder particles of polymer of ultra-high molecular weight polyolefin do not melt enough, probably due to molecular chain entangling too strongly, giving rise to voids or the like in a step described later such as compression molding for preparing a formed article of ultra-high molecular weight polyolefin, and disadvantages appear, such as the article turning cloudy. In addition, it is anticipated that, probably due to such interfaces not sufficiently fusing/adhering or the like in a stretching step described later in which rolling, drawing, compression or the like, of the formed article of ultra-high molecular weight polyolefin is carried out, and disadvantages appear, such as the stretching cannot be carried out sufficiently.

In addition, polymers of ultra-high molecular weight polyolefin particularly preferably used in the present embodiment are those obtained by polymerization using so-called Ziegler catalyst or the like. Hereafter, a polymer of ultra-high molecular weight polyethylene, which is a copolymer of ethylene and α-olefin having 3 to 10 carbons, will be described in detail as a preferred example for producing a polymer of ultra-high molecular weight polyolefin using a Ziegler catalyst.

A polymer of ultra-high molecular weight polyethylene can be obtained, for instance, by copolymerization of α-olefin having on the order of 3 to 10 carbons with a high density product referred to as so-called homopolyethylene obtained by polymerization of ethylene alone by a Ziegler catalyst.

Here, if a large amount of comonomer (α-olefin) is reacted in a polymerization system with such purpose as lowering the density of the formed article of ultra-high molecular weight polyethylene, dissolution in the solvent used and generation of aggregated polymers occur, such that circumstances may occur, where conducting the reaction continuously in a stable manner is difficult. In addition, aggregated polymer generated in this way may become mixed within the ultra-high molecular weight polyethylene formed article as a foreign substance, influencing transparency, mechanical properties, and the like. Therefore, the quantity of comonomer in the polymer of ultra-high molecular weight polyethylene, is preferably 0.01 mol % or greater but less than 1 mol %, and more preferably 0.1 mol % or greater but less than 0.8 mol %.

As Ziegler catalysts used when producing the polymer of ultra-high molecular weight polyethylene, those containing the solid catalyst constituent [A] and organometallic compound constituent [B] described below are preferred.

The solid catalyst constituent [A] is obtained by having a Carrier (A-1), prepared by reaction of an organomagnesium compound and a chlorination agent, support a titanium compound (A-2). Such reaction of the organomagnesium compound and the chlorination agent is carried out preferably at 60° C. or higher and 150° C. or lower. At a temperature lower than 60° C., since the speed of reaction between the organomagnesium compound and the chlorination agent is too slow, the cohesive strength of the solid (carrier) generated by the reaction may become lower, decreasing the bulk density. On the other hand, at a temperature higher than 150° C., since the speed of reaction between the organomagnesium compound and the chlorination agent becomes too fast, cohesive structure of the solid (carrier) generated by the reaction may become distorted and the morphology of the solid (carrier) irregular, decreasing the bulk density.

Carrier (A-1) is synthesized by reaction between the organomagnesium compound represented by the following General Formula (1), and the chlorination agent represented by the following General Formula (2), both of which are soluble in an inactive hydrocarbon solvent.

As organomagnesium compounds used when synthesizing Carrier (A-1), those represented by the following General Formula (1) are preferred.

$$(M^1)_\alpha(Mg)_\beta(R^1)_a(R^2)_b(OR^3)_c \qquad (1)$$

(in General Formula (1), $M^1$ represents at least one species of metal atom other than magnesium selected from the metal atom group belonging to the first group, the second group, the twelfth group and the thirteenth group of the periodic table, $R^1$, $R^2$ and $R^3$ each independently represents a hydrocarbon group having two or more but 20 or less carbons, α, β, a, b and c each independently represents a real number satisfying the relationships $0 \leqq \alpha$, $0 \leqq \beta$, $0 \leqq a$, $0 \leqq b$, $0 \leqq c$, $0 \leqq a+b$, $0 \leqq c/(\alpha+\beta) \leqq 2$ and $k\alpha+2\beta=a+b+c$ (k represents the valence of $M^1$))

Although the organomagnesium compound of General Formula (1) described above is represented in the form of a complex compound of the organomagnesium soluble in an inactive hydrocarbon solvent, it is one that includes all the complexes between the dihydrocarbyl magnesium compounds and compounds of General Formula (1) and other metallic compounds. Note that the relationship formula $k\alpha+2\beta=a+b+c$ of the symbols α, β, a, b and c represents the stoichiometric character of the valence and substituents of the metal atom.

In the above General Formula (1), the hydrocarbon groups represented by $R^1$ and $R^2$ each independently represents an alkyl group, a cycloalkyl group or an aryl group, and, for instance, methyl group, ethyl group, propyl group, butyl group, propyl group, hexyl group, octyl group, decyl group, cyclohexyl group, phenyl group, and the like, may be cited, preferably each one being an alkyl group. Here, when $\alpha>0$ circumstance, the metal atom $M^1$ represents at least one species of metal atom other than magnesium selected from the metal atom group belonging to the first group, the second group, the twelfth group and the thirteenth group of the periodic table, and for instance, lithium, sodium, potassium, beryllium, zinc, boron, aluminum, and the like, may be cited, aluminum, boron, beryllium and zinc being preferred.

In the above General Formula (1), although the ratio $\beta/\alpha$ of magnesium with respect to the metal atom $M^1$ can be set arbitrarily, the range is preferably 0.1 to 30, and particularly preferably 0.5 to 10. In addition, when using an organomagnesium compound of a certain species corresponding to the case where $\alpha=0$, for instance, when $R^1$ represents 1-methylpropyl or the like, since it is soluble in an inactive hydrocarbon solvent, a desirable result is provided when such a compound is used. Therefore, when $\alpha=0$ in General Formula (1), it is recommended that $R^1$ and $R^2$ are any one among the three groups (I), (II) and (III) indicated below:

(I) At least one of $R^1$ and $R^2$ is a secondary or tertiary alkyl group having 4 to 6 carbons, preferably, $R^1$ and $R^2$ both have 4 to 6 carbons and at least one is a secondary or a tertiary alkyl group.

(II) $R^1$ and $R^2$ are alkyl groups having different numbers of carbon from one another, preferably, $R^1$ is an alkyl group having 2 or 3 carbons, $R^2$ is an alkyl group having 4 carbons or more.

(III) At least one of $R^1$ and $R^2$ is a hydrocarbon group having six carbons or more, preferably, when the number of carbons contained in $R^1$ and $R^2$ is added, 12 or more is obtained.

In the following, (I) to (III) will be concretely given.

In (I), as secondary or tertiary alkyl groups having 4 to 6 carbons, for instance, 1-methylpropyl group, 2-methylpropyl group, 1,1-dimethylethyl group, 2-methylbutyl group, 2-ethylpropyl group, 2,2-dimethylpropyl group, 2-methylpentyl group, 2-ethylbutyl group, 2,2-dimethylbutyl group, 2-methyl-2-ethylpropyl group, and the like, may be cited; among these, 1-methylpropyl group is preferred.

In (II), as alkyl groups having 2 or 3 carbons, for instance, ethyl group, 1-methylethyl group, propyl group, and the like, may be cited; among these, ethyl group is preferred. In addition, as alkyl groups having 4 carbons or more, for instance, butyl group, pentyl group, hexyl group, heptyl group, octyl group, and the like, may be cited; among these, butyl group and hexyl group are preferred.

In (III), as hydrocarbon groups having 6 carbons or more, for instance, hexyl group, heptyl group, octyl group, nonyl group, decyl group, phenyl group, 2-naphthyl group, and the like, may be cited; among these, alkyl group is preferred, and among the alkyl groups, hexyl group and octyl group are more preferred.

Note that, generally, when the number of atoms contained in an alkyl group increases, dissolution in an inactive hydrocarbon solvent is facilitated while the viscosity of the solution becomes higher, such that using an alkyl group with a more than necessary long chain is not desirable for handling considerations. In addition, the organomagnesium compound of the above General Formula (1) may be used as an inactive hydrocarbon solution, and in this case, even if minute amounts of Lewis base compounds such as ether, ester and amine are contained or remaining in the solution, employment is possible without harm.

Next, alkoxy groups ($OR^3$) in the above General Formula (1) will be described. As hydrocarbon groups represented by $R^3$, alkyl groups or aryl groups having one or more but 12 or less carbons are preferred, and alkyl groups or aryl groups having three or more but 10 or less carbons are particularly preferred. Concretely, for instance, methyl group, ethyl group, propyl group, 1-methylethyl group, butyl group, 1-methylpropyl group, 1,1-dimethylethyl group, pentyl group, hexyl group, 2-methylpentyl group, 2-ethylbutyl group, 2-ethylpentyl group, 2-ethyl hexyl group, 2-ethyl-4-methylpentyl group, 2-propyl heptyl group, 2-ethyl-5-methyl octyl group, octyl group, nonyl group, decyl group, phenyl group, naphthyl group, and the like, may be cited; among these, butyl group, 1-methylpropyl group, 2-methylpentyl group and 2-ethyl hexyl group are preferred.

The organomagnesium compound of the above General Formula (1) is synthesized by a method whereby at least one species of organomagnesium compounds selected from the group comprising General Formulae $R^1MgX$ and $R^1{}_2Mg$ ($R^1$ has the meaning described previously and X represents a halogen atom) and at least one species of organometallic compounds selected from the group comprising General Formulae $M^1R^2{}_k$ and $M^1R^2{}_{(k-1)}H$ ($M^1$, $R^2$ and k have the meanings described previously) are reacted in an inactive hydrocarbon solvent between room temperature and 150° C., and if necessary, subsequently reacted with an alcohol having a hydrocarbon group represented by the above $R^3$ or an alkoxy magnesium compound, and/or, an alkoxy aluminum compound having a hydrocarbon group represented by the above $R^3$ soluble in an inactive hydrocarbon solvent.

Therein, regarding the sequence of addition when reacting an organomagnesium compound soluble in an inactive hydrocarbon solvent and an alcohol, any method can be used from the method of adding the alcohol into the organomagnesium compound, the method of adding the organomagnesium compound into the alcohol, or, the method of adding both simultaneously. Although there is no particular limitation regarding the reaction proportion between the organomagnesium compound soluble in an inactive hydrocarbon solvent and the alcohol, the range of the molar composition ratio $c/(\alpha+\beta)$ of the alkoxy group with respect to total metal atom in the organomagnesium compound containing an alkoxy group obtained as a result of the reaction, is preferably adjusted to become $0 \leqq c/(\alpha+\beta) \leqq 2$, and is particularly preferably adjusted to become $0 \leqq c/(\alpha+\beta) < 1$.

As the chlorination agent used when synthesizing Carrier (A-1) is preferably a silicon chloride compound represented by the following General Formula (2) having at least one Si—H bond.

$$H_dSiCl_eR^4{}_{(4-(d+e))} \quad (2)$$

(in General Formula (2), $R^4$ represents a hydrocarbon group having one or more but 12 or less carbons, d and e each independently represents a real number satisfying the relationships 0<d, 0<e and $0<d+e \leqq 4$)

In the above General Formula (2), the hydrocarbon group represented by $R^4$, is an aliphatic hydrocarbon group, an alicyclic hydrocarbon group or an aromatic hydrocarbon group, for instance, methyl group, ethyl group, propyl group, 1-methylethyl group, butyl group, pentyl group, hexyl group, octyl group, decyl group, cyclohexyl group, phenyl group, and the like, may be cited; among these, alkyl groups having 1 to 10 carbons are preferred, and alkyl group having 1 to 3 carbons such as methyl group, ethyl group, propyl group and 1-methylethyl group are particularly preferred. In addition, d and e are real numbers greater than 0 satisfying the relationship $d+e \leqq 4$, and in particular, e is preferably 2 or 3.

As concrete examples of silicon chloride compounds of the above General Formula (2), for instance, $HSiCl_3$, $HSiCl_2CH_3$, $HSiCl_2C_2H_5$, $HSiCl_2(C_3H_7)$, $HSiCl_2(2\text{-}C_3H_7)$, $HSiCl_2(C_4H_9)$, $HSiCl_2(C_6H_5)$, $HSiCl_2(4\text{-}Cl{-}C_6H_4)$, $HSiCl_2(CH{=}CH_2)$, $HSiCl_2(CH_2C_6H_5)$, $HSiCl_2(1\text{-}C_{10}H_7)$, $HSiCl_2(CH_2CH{=}CH_2)$, $H_2SiCl(CH_3)$, $H_2SiCl(C_2H_5)$, $HSiCl(CH_3)_2$, $HSiCl(C_2H_5)_2$, $HSiCl(CH_3)(2\text{-}C_3H_7)$, $HSiCl(CH_3)(C_6H_5)$, $HSiCl(C_6H_5)_2$, and the like, may be cited, and the silicon chloride compounds comprising these compounds or a mixture of two species or more selected from these compounds are used preferably. As the silicon chloride compounds, trichloro silane, monomethyldichloro silane, dimethylchloro silane and ethyldichloro silane are preferred, and trichloro silane and monomethyl dichloro silane are particularly preferred.

As the inactive hydrocarbon solvent, for instance, aliphatic hydrocarbons such as pentane, hexane and heptane, aromatic hydrocarbons such as benzene and toluene, alicyclic hydrocarbons such as cyclohexane and methyl cyclohexane, and the like, may be cited.

Next, the reaction between the organomagnesium compound and the silicon chloride compound will be described. The reaction is preferably carried out after pre-diluting the silicon chloride compound using a reaction solvent, for instance, the inactive hydrocarbon solvent: a chlorinated hydrocarbon such as 1,2-dichlorethane, o-dichlorbenzene or dichlormethane, an ether series medium such as diethyl ether or tetrahydrofuran or a mixed media thereof. In particular, the inactive hydrocarbon solvents are preferred for the performance of the catalyst. Although there is no particular limitation regarding the reaction proportion between the organomagnesium compound and the silicon chloride compound, in general, the range is preferably 0.01 to 100 mol of the silicon chloride compound with respect to one mol of the organomagnesium compound, and more preferably, the range is 0.1 to 10 mol of the silicon chloride compound with respect to one mol of the organomagnesium compound.

As reaction methods, for instance, the method of simultaneous addition in which the organomagnesium compound and the silicon chloride compound are reacted while being introduced simultaneously into a reactor, the method in which the silicon chloride compound is loaded beforehand into the reactor and then the organomagnesium compound is introduced into the reactor, or, the method in which the organomagnesium compound is loaded beforehand into the reactor and then the silicon chloride compound is introduced into the reactor, and the like, may be cited; however, the method in which the silicon chloride compound is loaded beforehand into the reactor and then the organomagnesium compound is introduced into the reactor is preferred. The solid constituent obtained by the above reaction is preferably isolated by a filtration or decantation method, and then, thoroughly washed using an inactive hydrocarbon solvent to eliminate unreacted products, side products or the like.

The reaction temperature is preferably 60° C. or higher and 150° C. or lower, more preferably 65° C. or higher and 150° C. or lower, and even more preferably 70° C. or higher and 150° C. or lower. If the reaction temperature is 60° C. or higher and 150° C. or lower, the reaction between the organomagnesium compound and the chlorination agent advances rapidly, and a highly active catalyst tends to be obtained readily, and, the polyolefin powder obtained by olefin polymerization using this catalyst tends to have a high bulk density.

Note that in the method of simultaneous addition in which the organomagnesium compound and the silicon chloride compound are reacted while being introduced simultaneously into a reactor, the actual reaction temperature may be set to a prescribed temperature by adjusting the temperature of the reactor to a prescribed temperature beforehand and adjusting the temperature inside the reactor to a prescribed temperature while carrying out the simultaneous addition. Meanwhile, in the method in which the silicon chloride compound is loaded beforehand into the reactor and then the organomagnesium compound is introduced into the reactor, the actual reaction temperature may be set to a prescribed temperature by adjusting the temperature of the reactor loaded with the silicon chloride compound to a prescribed temperature and adjusting the temperature inside the reactor to a prescribed temperature while introducing the organomagnesium compound into the reactor. On the other hand, in the method in which the organomagnesium compound is loaded beforehand into the reactor and then the silicon chloride compound is introduced into the reactor, the actual reaction temperature may be set to a prescribed temperature by adjusting the temperature of the reactor loaded with the organomagnesium compound to a prescribed temperature and adjusting the temperature inside the reactor to a prescribed temperature while introducing the silicon chloride compound into the reactor.

The above reaction between the organomagnesium compound and the silicon chloride compound can also be carried out in the presence of a solid. The solid used here may be any of an inorganic solid and organic solid, the inorganic solid being preferred. Although there is no particular limitation for the inorganic solid, it is preferably any of (i) to (v) below:
(i) inorganic oxide.
(ii) inorganic carbonate, silicate and/or sulfate.
(iii) inorganic hydroxide.
(iv) inorganic halide.
(v) double salt, solid solution and/or mixture of (i) to (iv).

As concrete examples of the above inorganic solids, for instance, silica, alumina, silica alumina, hydrated alumina, magnesia, thoria, titania, zirconia, calcium phosphate•barium sulfate, calcium sulfate, magnesium silicate, magnesium•calcium, aluminum silicate [(Mg.Ca)O.$Al_2O_3$.$5SiO_2$.$nH_2O$], potassium aluminum silicate [$K_2O$.$3Al_2O_3$.$6SiO_2$.$2H_2O$], magnesium iron silicate [(Mg.Fe)$2SiO_4$], aluminum silicate [$Al_2O_3$.$SiO_2$], calcium carbonate, magnesium chloride, magnesium iodide, and the like, may be cited; among these, silica, silica alumina and magnesium chloride are particularly preferred. The relative surface area of such inorganic solids is preferably 20 $m^2$/g or greater, and particularly preferably 90 $m^2$/g or greater.

Hereafter, titanium compound (A-2) will be described.

As the titanium compounds (A-2) used here, those represented by the following General Formula (3) are preferred.

$$Ti(OR^5)_fX_{(4-f)} \tag{3}$$

(in the General Formula (3), f represents a real number of 0 or greater and 4 or less, $R^5$ represents a hydrocarbon group having 1 or more and 20 or less carbons, and X represents a halogen atom)

In General Formula (3), as hydrocarbon groups represented by $R^5$, for instance, aliphatic hydrocarbon groups such as methyl group, ethyl group, propyl group, butyl group, pentyl group, hexyl group, 2-ethylhexyl group, heptyl group, octyl group, decyl group and allyl group; alicyclic hydrocarbon groups such as cyclohexyl group, 2-methyl cyclohexyl group and cyclopentyl group; aromatic hydrocarbon groups such as phenyl group and naphthyl group, and the like, may be cited; among these, aliphatic hydrocarbon groups are preferred. As halogen atoms represented by X, chlorine, bromine, iodide, and the like, may be cited; among these, chlorine is preferred. Note that the titanium compound (A-2) can be used by mixing two species or more.

The amount of the titanium compound (A-2) used is not limited in particular, and in molar ratio of magnesium contained in the titanium compound (A-2) with respect to the magnesium atoms contained in the solid constituent, it is preferably 0.01 or more and 20 or less, and particularly preferably 0.05 or more and 10 or less. In addition, there is no particular limitation regarding the reaction temperature, and a range of 25° C. or higher and 150° C. or lower is preferred.

Although there is no particular limitation for the method of supporting the titanium compound (A-2) on Carrier (A-1), for instance, the method of reacting excess titanium compound (A-2) with respect to Carrier (A-1), the method of using a third constituent to support titanium compound (A-2) effectively, and the like, may be cited; among these, the method of support by reaction between titanium compound (A-2) and the following organometallic compound (A-3) is particularly preferred.

Hereafter, organometallic compound (A-3) will be described. As the organometallic compounds (A-3) used here, those represented by the following General Formula (4) are preferred:

$$(M^2)_\gamma(Mg)_\epsilon(R^6)_h(R^7)_iY_j \tag{4}$$

(In General Formula (4), $M^2$ represents at least one species of metal atom other than magnesium selected from the metal atom group belonging to the first group, the second group, the twelfth group and the thirteenth group of the periodic table, $R^6$ and $R^7$ each independently represents a hydrocarbon group having two or more but 20 or less carbons, Y represents an alkoxy group, a siloxy group, an alyloxy group, an amino group, an amide group, —N═C—$R^8$, $R^9$, —$SR^{10}$ (where $R^8$, $R^9$ and $R^{10}$ represent a hydrocarbon group having two or more but 20 or less carbons, and may be different from one another or identical when j is 2 or greater), or a β-keto acid residue, γ, ε, h, i and j each independently represents a real number satisfying the relationships $0 \leqq \gamma$, $0 \leqq \epsilon$, $0 \leqq h$, $0 \leqq i$, $0 < h+i$, $0 \leqq j/(\gamma+\epsilon) \leqq 2$ and $n\gamma+2\epsilon=a+b+c$ (where, n represents the valence of $M^2$))

Although the organometallic compound (A-3) of the above General Formula (4), is given in the form of a complex compound of organomagnesium soluble in an inactive hydrocarbon solvent, it is one that comprises all the complexes between a dihydrocarbyl magnesium compound and the compound of General Formula (4) and other metallic compounds. Note that, the relationship formula $n\gamma+2\epsilon=h+i+j$ of the symbols γ, ε, h, i and j represents the stoichiometric character of the valence and substituents of the metal atom.

In the above General Formula (4), the hydrocarbon groups represented by $R^6$, $R^7$, $R^8$, $R^9$ and $R^{10}$ each independently represents, an alkyl group, a cycloalkyl group or an aryl group, and, for instance, methyl group, ethyl group, propyl group, butyl group, propyl group, hexyl group, octyl group, decyl group, cyclohexyl group, phenyl group, and the like, may be cited and preferably alkyl group. Here, when $\gamma>0$, metal atom $M^2$ represents at least one species of metal atom other than magnesium selected from the metal atom group belonging to the first group, the second group, the twelfth group and the thirteenth group of the periodic table, and for instance, lithium, sodium, potassium, beryllium, zinc, boron, aluminum, and the like, may be cited, and preferably aluminum, boron, beryllium and zinc.

In the above General Formula (4), although the ratio $\epsilon/\gamma$ of magnesium with respect to metal atom $M^2$ can be set arbitrarily, the range is preferably 0.1 to 30, and particularly preferably 0.5 to 10. In addition, when using an organomagnesium compound of a given species corresponding to the case where $\gamma=0$, for instance, when $R^6$ represents a 1-methylpropyl group or the like, since it is soluble in an inactive hydrocarbon solvent, a desirable result is provided when such a compound is used. Therefore, when $\gamma=0$ in General Formula (4), it is recommended that $R^6$ and $R^7$ are any one among the three groups (IV), (V) and (VI) indicated below:

(IV) At least one of $R^6$ and $R^7$ is a secondary or tertiary alkyl group having 4 to 6 carbons, preferably, $R^6$ and $R^7$ both have 4 to 6 carbons and at least one is a secondary or a tertiary alkyl group.

(V) $R^6$ and $R^7$ are alkyl groups having different numbers of carbon from one another, preferably, $R^6$ is an alkyl group having 2 or 3 carbons, $R^7$ is an alkyl group having 4 carbons or more.

(IV) At least one of $R^6$ and $R^7$ is a hydrocarbon group having six carbons or more, preferably, when the number of carbons contained in $R^6$ and $R^7$ is added, 12 or more is obtained.

In the following, (IV) to (VI) will be concretely given.

In (IV), as secondary or tertiary alkyl groups having 4 to 6 carbons, for instance, 1-methylpropyl group, 2-methylpropyl group, 1,1-dimethylethyl group, 2-methylbutyl group, 2-ethylpropyl group, 2,2-dimethylpropyl group, 2-methylpentyl group, 2-ethylbutyl group, 2,2-dimethylbutyl group, 2-methyl-2-ethylpropyl group, and the like, may be cited; among these, 1-methylpropyl group is preferred.

In (V), as alkyl groups having 2 or 3 carbons, for instance, ethyl group, 1-methylethyl group, propyl group, and the like, may be cited; among these, ethyl group is preferred. In addition, as alkyl groups having 4 carbons or more, for instance, butyl group, pentyl group, hexyl group, heptyl group, octyl group, and the like, may be cited; among these, butyl group and hexyl group are preferred.

In (VI) as hydrocarbon groups having 6 carbons or more, for instance, hexyl group, heptyl group, octyl group, nonyl group, decyl group, phenyl group, 2-naphthyl group, and the like, may be cited; among these, alkyl group is preferred, and among the alkyl groups, hexyl group and octyl group are more preferred.

Note that, generally, when the number of atoms of an alkyl group increases, dissolution in an inactive hydrocarbon solvent is facilitated while the viscosity of the solution becomes higher, such that using an alkyl group with a more than necessary long chain is not desirable for handling considerations. In addition, the organomagnesium compound of the above General Formula (4) may be used as an inactive hydrocarbon solution, and in this case, even if minute amounts of Lewis base compounds such as ether, ester and amine are contained or remaining in the solution, employment is possible without harm.

Next, Y in the above General Formula (4) will be described. Y represents an alkoxy group, a siloxy group, an alyloxy group, an amino group, an amide group, —N═C—$R^{11}$, $R^{12}$, or —$SR^{13}$ (here, $R^{11}$, $R^{12}$ and $R^{13}$ each independently represents a hydrocarbon group having two or more but 20 or less carbons)

In the above General Formula (4), as hydrocarbon groups represented by $R^{11}$ to $R^{13}$, alkyl groups or aryl groups having one or more but 12 or less carbons are preferred, and alkyl groups or aryl groups having three or more but 10 or less carbons are particularly preferred. Concretely, for instance, methyl group, ethyl group, propyl group, 1-methylethyl group, butyl group, 1-methylpropyl group, 1,1-dimethylethyl group, pentyl group, hexyl group, 2-methylpentyl group, 2-ethylbutyl group, 2-ethylpentyl group, 2-ethyl hexyl group, 2-ethyl-4-methylpentyl group, 2-propyl heptyl group, 2-ethyl-5-methyl octyl group, octyl group, nonyl group, decyl group, phenyl group, naphthyl group, and the like, may be cited; butyl group, 1-methylpropyl group, 2-methylpentyl group and 2-ethyl hexyl group are particularly preferred.

The organomagnesium compound of the above General Formula (4) is synthesized by a method whereby at least one species of organomagnesium compounds selected from the group comprising General Formulae $R^6MgX$ and $R^6{}_2Mg$ ($R^6$ has the meaning described above and X represents a halogen atom) and at least one species of organometallic compounds selected from the group comprising General Formulae $M^2R^7{}_n$ and $M^2R^7{}_{(n-1)}H$ ($M^2$ and $R^7$ have the meanings described above and n represents the valence of $M^2$) are reacted in an inactive hydrocarbon solvent at 25° C. or higher and 150° C. or lower, and if necessary, subsequently reacted with an alcohol having a hydrocarbon group represented by the above $R^3$, and/or an alkoxy magnesium compound or an alkoxy aluminum compound having a hydrocarbon group represented by the above $R^3$ soluble in an inactive hydrocarbon solvent.

Here, regarding the sequence of addition when reacting an organomagnesium compound soluble in an inactive hydrocarbon solvent and an alcohol, any method can be used from the method of adding the alcohol into the organomagnesium compound, the method of adding the organomagnesium compound into the alcohol, or, the method of adding both simultaneously. Although the reaction proportion between the organomagnesium compound soluble in an inactive hydrocarbon solvent and the alcohol is not limited in particular, the molar composition ratio $c/(\gamma+\epsilon)$ of the alkoxy group with respect to total metal atom in the organomagnesium compound containing an alkoxy group obtained as a result of the reaction, is preferably adjusted to become, $0\leqq c/(\gamma+\epsilon)\leqq 2$, and is particularly preferably adjusted to become $0\leqq c/(\gamma+\epsilon)<1$.

The amount of organometallic compound (A-3) is not limited in particular, and in molar ratio of Mg contained in (A-3) with respect to the magnesium atoms contained in the solid constituent, it is preferably 0.01 or more and 20 or less, and particularly preferably 0.05 or more and 10 or less. In addition, there is no particular limitation regarding the reaction temperature, and a range of −80° C. or higher and 150° C. or lower is preferred, and a range of −40° C. to 100° C. is more preferred.

As the addition sequence of the above titanium compound (A-2) and organometallic compound (A-3), for instance, any of the method of adding (A-3) after (A-2), the method of adding (A-2) after (A-3), and the method of adding (A-2) and (A-3) simultaneously, is possible; however, the method of adding (A-2) and (A-3) simultaneously is preferred. In addition, the quantity of these used, in molar ratio of the organometallic compound (A-3) with respect to the above titanium compound (A-2), is preferably in a range of 0.1 to 10, and more preferably in a range of 0.5 to 5. Note that the above reaction between the titanium compound (A-2) and the organometallic compound (A-3) is preferably carried out in an inactive hydrocarbon solvent; in this case, for instance, an aliphatic hydrocarbon solvent such as hexane and heptane is used preferably.

The solid catalyst constituent [A] obtained in this way can be used as a slurry solution using an inactive hydrocarbon solvent. As described above, the solid catalyst constituent [A] is preferably used in combination with an organometallic compound constituent [B], and when used in combination in this way, it becomes a catalyst for polymerization having higher activity.

The organometallic compound constituent [B] is preferably a compound containing at, least one species of metal atom selected from the metal atom group belonging to the first group, the second group and the thirteenth group of the periodic table, and particularly preferably is the organic aluminum compound (B-1) and/or the organomagnesium compound (B-2).

The organic aluminum compound (B-1), preferably uses the compound represented by the following General Formula (5) alone or as a mixture:

$$AlR^{14}_{p}Z_{(3-p)} \quad (5)$$

(In General Formula (5), $R^{14}$ represents a hydrocarbon group having one or more and 20 or less carbons, Z represents one species of substituent selected from the group comprising hydrogen atom, halogen atom, alkoxy group, alyloxy group and siloxy group, p represents a number of 2 or greater and 3 or less)

In the above General Formula (5), as hydrocarbon groups having one or more and 20 or less carbons represented by $R^{14}$, are those including aliphatic hydrocarbon, aromatic hydrocarbon and alicyclic hydrocarbon, for instance, trialkyl aluminum such as trimethyl aluminum, triethyl aluminum, tripropyl aluminum, tributyl aluminum, tri(2-methylpropyl) aluminum, tripentyl aluminum, tri(3-methylbutyl)aluminum, trihexyl aluminum, trioctyl aluminum and tridecyl aluminum; halogenated aluminum compounds such as diethyl aluminum chloride, ethyl aluminum dichloride, di(2-methylpropyl)aluminum chloride, ethyl aluminum sesquichloride and diethyl aluminum bromide; alkoxy aluminum compounds such as diethyl aluminum ethoxide and di(2-methylpropyl) aluminum butoxide; siloxy aluminum compounds such as dimethyl hydrosiloxy aluminum dimethyl, ethyl methyl hydrosiloxy aluminum diethyl and ethyl dimethylsiloxy aluminum diethyl and mixtures thereof may be cited; among these, trialkyl aluminum compounds are particularly preferred.

As organomagnesium compound (B-2), the compounds represented by the above General Formula (1) are preferred. Although this organomagnesium compound (B-2) is given in the form of a complex compound of organomagnesium soluble in an inactive hydrocarbon solvent, it is one that includes all the complexes between the dialkyl magnesium compound and compound of General Formula (1) and other metallic compound. Note that, regarding α, β, a, b, c, $M^1$, $R^1$, $R^2$ and $OR^3$ in the General Formula (1), the descriptions are as already given, and since a compound soluble in an inactive hydrocarbon solvent is desirable as the organomagnesium compound (B-2), ratio β/α of magnesium with respect to metal atom $M^1$ is preferably in a range of 0.5 to 10, in addition, more preferably, $M^1$ represents aluminum.

The solid catalyst constituent [A] and the organometallic compound constituent [B] described above, may be added into the polymerization system under the polymerization conditions, or may have been added into the system prior to polymerization. In addition, as proportion of both constituents to be combined, the organometallic compound [B] is preferably in a range of 1 to 3000 millimoles with respect to 1 g of solid catalyst constituent [A].

Note that polymerization temperature during polymerization time, in general is preferably 40° C. or higher, more preferably 50° C. or higher, and even more preferably 60° C. or higher, and, preferably 100° C. or lower, and more preferably 85° C. or lower. In addition, polymerization pressure during polymerization, in general, is preferably ordinary pressure or greater and 2 MPa or less, more preferably 0.1 MPa or greater and 1.5 MPa or less, even more preferably 0.1 MPa or greater and 1.0 MPa or less. Note that this polymerization reaction can also be carried out by any of batch, semicontinuous and continuous methods.

In addition, the polymerization reaction can also be carried out by separating into two or more stages having different reaction conditions. In addition, for instance, as described in the specification of West German Patent Application Publication No. 3127133, the molecular weight of the obtained polymer of ultra-high molecular weight polyolefin, can also be adjusted by the presence of hydrogen in the polymerization system, or, by modifying the polymerization temperature, or the like.

Then, the above polymer of ultra-high molecular weight polyethylene can contain, in addition to each constituent such as described above, other constituents useful for producing the ultra-high molecular weight ethylene polymer.

(Formed Article of Ultra-High Molecular Weight Polyolefin)

In order to obtain the stretch-formed sheet of ultra-high molecular weight polyolefin of the present embodiment, a formed article of ultra-high molecular weight polyolefin, which is a preliminary formed article prior to stretching, containing a specific polymer of ultra-high molecular weight polyolefin described above, must be prepared.

Such formed article of ultra-high molecular weight polyolefin can be prepared, for instance, by conventional compression molding, extrusion molding (screw extrusion, ram extrusion), injection molding or the like, of a polymer of ultra-high molecular weight polyolefin in powder form (raw material powder). In addition, the formed article of ultra-high molecular weight polyolefin prior to stretching can be obtained also by further shaving with a skive or the like the primary formed product obtained by compression molding or the like.

From the point of view of obtaining the desired formed article of ultra-high molecular weight polyolefin, the density of the polymer of ultra-high molecular weight polyolefin used here is preferably 925 $kg/m^3$ or less and more preferably 920 $kg/m^3$ or less. Although the lower limit value of the density is not limited in particular, since physical properties such as stiffness of the formed article may decrease along with the decrease of density, 910 $kg/m^3$ or greater is preferred.

In addition, in order to obtain the desired formed article of ultra-high molecular weight polyolefin, bulk density of the raw material powder is preferably high. If the bulk density of such raw material powder is low, since many air bubbles are present among the raw material powder, when loaded into a molding die and compressed, oxidative deterioration or the like occurs due to the oxygen contained in the air bubbles, and phenomena such as decreasing mechanical properties may occur due to the decrease in molecular weight. In addition, in the preliminary formed article, an air bubble may remain molding an air scatterer, such that an influence exerted on transparency is anticipated. Therefore, the bulk density of the raw material powder is preferably 0.35 g/100 cc or greater, and more preferably 0.40 g/100 cc or greater.

Note that, it is commonly known that the bulk density of the raw material powder may be increased by addition of an additive, for instance, a lubricant such as calcium stearate. On the other hand, it is commonly known that if an additive is included in a raw material powder, disadvantages may appear, such as thermal adhesiveness at molding time deteriorating, or additive bleeding on the surface of the formed product and contaminating the surface. From the above, increasing the bulk density of the raw material powder in a state where an additive is not present is preferred.

The shape of the formed article of ultra-high molecular weight polyolefin prepared as described above may adopt any shape and is not limited in particular; however, from the point of view of ease of molding, those in sheet form are preferred.

(Stretch-Formed Sheet of Ultra-High Molecular Weight Polyolefin)

A stretch-formed sheet of ultra-high molecular weight polyolefin of the present embodiment having excellent transparency and mechanical properties is obtained by subjecting the specific formed article of ultra-high molecular weight polyolefin prepared as described earlier to a secondary processing such as stretching. Concretely, such a stretch-formed sheet of ultra-high molecular weight polyolefin is obtained by stretching a residually pre-heated formed article of ultra-high molecular weight polyolefin in sheet form, for instance, to a thickness of 0.2 mm or greater by rolling with a roll or the like.

Note that, stretching referred to here is a concept comprising compression, rolling and drawing and the like. In order to exhibit more homogeneous transparency, rolling or drawing is preferred, and if continuous production is considered, rolling is more preferable. Stretch processing such as compression, rolling and drawing can be carried out based on well known methods, and for instance, as drawing method, method of drawing by the roll drawing method or the zone drawing method while heating with a heater or hot air, or the like, can be adopted.

In addition, the stretch-formed sheet of ultra-high molecular weight polyolefin of the present embodiment is one that has been stretched at least in one direction within the plane of the sheet, and in addition to those that have been, for instance, uniaxially stretched or biaxially stretched, those that have been stretched isotropically within the plane of the sheet without directional anisotropy are included. In addition, the operation of transitioning from the formed article of ultra-high molecular weight polyolefin prior to stretching to the stretching step can be carried out continuously or non-continuously.

Here, in order to obtain the target stretch-formed sheet of ultra-high molecular weight polyolefin, a formed article of ultra-high molecular weight polyolefin having a density of 925 kg/$m^3$ or less is deemed necessary. If such density is greater than 925 kg/$m^3$, the degree of crystallinity becomes high, and there is the tendency that haze becomes high and the total amount of light transmitted becomes small. The density of the formed article of ultra-high molecular weight polyolefin is preferably 923 kg/$m^3$ or less, and more preferably 921 kg/$m^3$ or less. Although the lower limit value of the density is not limited in particular, since physical properties such as stiffness of the formed article may decrease along with the decrease in density, 910 kg/$m^3$ or greater is preferred.

Note that it is also possible to adjust the molecular weight (intrinsic viscosity)/density of the formed article of ultra-high molecular weight polyolefin by crosslinking using a peroxide or the like. However, if crosslinking occurs heterogeneously, disadvantages may appear such as, mechanical properties decreasing locally and transparency decreasing due to the degree of crystallinity being different, such that from the point of view of homogeneity, the molecular weight (intrinsic viscosity)/density is adjusted preferably on the raw material side.

Meanwhile, if the temperature during stretching is higher than the melting point of the formed article of ultra-high molecular weight polyolefin, recrystallization may occur after melting (after stretching), decreasing the transparency of the stretch-formed sheet obtained. That is to say, one purpose of the stretch processing carried out here is to elevate transparency by stretching thereby destroying the crystalline body present inside the formed article and scattering light, that is to say, the lamella structure, down to a size that is the wavelength of the light or smaller; however, if the formed article is stretched in a molten state, transparency may become lost due to the lamella structure regenerated during recrystallization after stretching. Actually, there are circumstances where obtaining a stretch-formed sheet having excellent transparency is difficult when a formed article is melted and stretched. In order to avoid these disadvantages beforehand, it is also possible to conceive obtaining a formed article that does not contain a lamella structure by processing the raw material powder at the melting point or lower; however, in this case, the formed article obtained is a sintered product, compressed product, or the like, in which adhesive strength of particles interface is low, which is not expected to allow sufficient stretching to be carried out.

From the above, in order to obtain a stretch-formed sheet having excellent transparency, it is preferable that once the raw material powder or the like has been melted and compression formed, extrusion molded, injection molded, or the like, the formed article of ultra-high molecular weight polyolefin obtained thereby is stretched at a temperature of the melting point or lower. More concretely, the stretching temperature is preferably in the range of "ordinary temperature" or higher but less than "the melting point of the formed article of ultra-high molecular weight polyolefin", more preferably "the melting point—60° C." or higher but less than "the melting point", and even more preferably "the melting point—30° C." or higher but less than "the melting point". Note that the term "melting point" used herein is a value measured under atmospheric pressure with, a differential scanning calorimeter (DSC).

When stretching, the stretch ratio ($\chi$), which is given by the following Formula (2), is preferably 1.3-times or greater, more preferably 1.5-times or greater, even more preferably 3-times or greater, and particularly preferably 5-times or greater.

$$\chi = t1/t2 \quad \text{Formula (2)}$$

t1: thickness prior to stretching (mm)

t2: thickness after stretching (mm)

If the stretch ratio ($\chi$) is less than 1.3-times, there are circumstances where sufficient transparency and mechanical properties cannot be obtained. Although the upper limit of such stretch ratio ($\chi$) is not limited in particular, from the point of view of formability, it is preferably 20-times or less, more preferably 15-times or less, and even more preferably 10-times or less. Here, when stretching by rolling, the upper limit of the stretch ratio ($\chi$) is preferably 50-times or less, more preferably 30-times or less, and particularly preferably 10-times or less.

The stretch-formed sheet of ultra-high molecular weight polyolefin of the present embodiment obtained in this way, regardless of being relatively thick having a thickness of 0.2 mm or greater, is a sheet having extremely high transparency while at the same time having excellent mechanical properties, compared to prior art.

The thickness of the ultra-high molecular weight polyolefin stretch-formed sheet is 0.2 mm or greater, preferably 0.4 mm or greater and 10.0 mm or less, and more preferably 0.7 mm or greater and 5.0 mm or less. When the thickness is less than 0.2 mm, although useful in film applications or the like where high transparency is sought, in formed sheet applications in which excellent mechanical properties are sought, the sheet may exhibit disadvantages in practice, such as the absolute value of mechanical strength is insufficient, or the shape cannot be retained due to its own weight.

The value of internal haze in the thickness direction of the stretch-formed sheet of ultra-high molecular weight polyolefin is 70% or less, preferably 50% or less, more preferably 30% or less, and particularly preferably 20% or less. If the internal haze in the thickness direction is greater than 70%, the sheet cannot be referred to as having sufficiently high transparency, which may limit practical applications. Generally, with an internal haze in the thickness direction in the range of 30% or greater but less than 70%, although in a slightly clouded state, the sheet is transparent to the extent that when looking through at a letter or the like, the letter or the like can be easily recognized. In addition, if the internal haze in the thickness direction is 20% or less, cloudiness cannot felt visually, and the state is almost transparent to the eyes.

The internal haze in the thickness direction of the stretch-formed sheet of ultra-high molecular weight polyolefin was measured according to JIS-K7136.

Note that, since haze is influenced by scratches on the surface or the surface roughness of a stretch-formed sheet, herein, the measurement of internal haze was performed under immersed condition in water, alcohols and the like, with no influence of external haze.

In addition, the stretch-formed sheet of ultra-high molecular weight polyolefin has a haze in the thickness direction at 2 mm-thickness of preferably 70% or less, more preferably 50% or less, even more preferably 30% or less, and particularly preferably 20% or less.

Here, to measure the value of haze in the thickness direction at 2 mm-thickness, it suffices to use a 2 mm-thick stretch-formed sheet; however, for a stretch-formed sheet that is not 2 mm-thick, the handling was as follows.

From experience, the relationship between the value of haze and the thickness of a stretch-formed sheet can be defined by the relationship formula (value of haze Ht; %)=a×t (thickness of stretch-formed sheet; mm)+b, a and b are related to the density of the formed article; moreover, the thickness dependency of the haze has been found to be different, with the neighborhood of 2 mm for the thickness of the stretch-formed sheet as the boundary.

That is to say, for a stretch-formed sheet having a thickness of 2 mm or less, the slope a in the relationship formula of thickness dependency of the haze described above can be determined by a=309×d (density: g/$cm^3$)−264. Therefore, the parameter b can be calculated by introducing into the above relationship formula the obtained parameter a and the already-known thickness t (mm) and value of haze Ht (%) of the stretch-formed sheet that is the subject of the measurement. From the relationship formula completed in this way, the value of the haze at a thickness of 2 mm, which is when t=2, can be estimated.

Meanwhile, when the thickness of the stretch-formed sheet exceeds 2 mm, the slope a in the relationship formula of thickness dependency of the haze described above can be determined by a=−640×d (density: g/$cm^3$)+600. Therefore, similarly to above, the parameter b can be calculated by introducing into the above relationship formula the obtained parameter a and the already-known thickness t (mm) and value of haze Ht (%) of the stretch-formed sheet that is the subject of the measurement, the value of the haze at a thickness of 2 mm, which is when t=2, can be estimated from the completed relationship formula.

As a result of earnest studies to compute haze without depending on the thickness of a stretch-formed sheet of ultra-high molecular weight polyolefin, the present inventors discovered that the value of the haze behaved differently with a specific thickness as the boundary, and in addition, found that the correlation formula demonstrating the thickness dependency of the haze depended on the density of the formed article, and the above experimental formula was completed. Such an experimental formula is a parameter serving as an important indicator when determining the haze of a stretch-formed sheet converted to a specific thickness.

Note that the slope a of the thickness dependency of the haze in a stretch-formed sheet that is 2 mm or less tends to be larger than the slope a of the thickness dependency of the haze in a stretch-formed sheet that is 2 mm or greater. In addition, even if they have a thickness of 2 mm or less, there are many stretch-formed sheets having a high density demonstrating 80% or greater in haze actual measurement, and if the haze for a thickness of 2 mm is extrapolated with the relationship formula of the haze and thickness for 2 mm or less, sometimes 100% is exceeded. In this case, even if the thickness of the stretch-formed sheet is 2 mm or less, the one extrapolated with the thickness dependency relationship formula of the haze at 2 mm or greater is a value that is closer to reality.

In addition, the above relationship formula can be applied to the relationship between the value of the haze and the thickness of a formed article even if stretch molding has not been carried out.

In addition, the stretch-formed sheet of ultra-high molecular weight polyolefin has a heat shrinkage rate (γ) indicated by the following Formula (1) of preferably 5% or greater in at least one of an MD direction in which stretching is carried out and a TD direction perpendicular thereto (MD and TD directions are two directions that are perpendicular within the plane of the stretch-formed sheet). Such heat shrinkage rate (γ) is calculated by adjusting the state of the stretch-formed sheet of ultra-high molecular weight polyolefin at 120° C. for 30 minutes in a dryer (left stored), then letting it to cool at ordinary temperature for 30 minutes, and based on the dimensional changes before and after this state adjustment.

$$\gamma V(\%)=100\times(L0-L)/L0 \qquad \text{Formula (1)}$$

γ: heat shrinkage rate

L0: initial length of stretch-formed sheet

L: length of stretch-formed sheet after state adjustment at 120° C. for 30 minutes The higher this heat shrinkage rate (γ) the higher the transparency tends to be; in other words, when both heat shrinkage rates (γ) in the MD direction and the TD direction are less than 5%, sometimes there is no sufficient transparency. On the other hand, in applications where the uses are under high temperatures exceeding 100° C., from such point of view as dimensional stability, preferably, the shrinkage rate is not excessively high. In addition, even in applications where the uses are under temperatures of 100° C. or lower, an appropriate degree of balance between transparency and dimensional stability due to heat shrinkage is preferable, so that a satisfactory dimensional stability is obtained. Therefore, from the point of view of the balance between transparency and dimensional stability, the upper limit of the heat shrinkage rate is preferably 60% or less, more preferably 50% or less, and even more preferably 45% or less.

Note that although the shape of the stretch-formed sheet may be altered by the heat shrinkage, many times, large alteration of transparency is not observed. Therefore, heat shrinkage of stretch-formed sheet is thought to be a phenomenon arising from the state adjustment at 120° C. for 30 minutes relieving the distortion generated by the macromolecular chains being oriented to a high degree in the stretching step deemed necessary for exhibiting extremely high transparency.

In addition, in the stretch-formed sheet of ultra-high molecular weight polyolefin of the present embodiment having a thickness of 0.2 mm or greater, the relationship between the thickness t (mm) thereof and the total light transmittance T (%) actually measured based on JIS K-7361 is preferably one that satisfies the following Formula (3).

$$T > a \times (t) + b \qquad \text{Formula (3)}$$

In the above Formula (3), the total light transmittance T (%) is the actual value measured according to JIS K-7361-1, a=−9.2 and b=85.0. Here, in the above Formula (3), the right member a×(t)+b is the total light transmittance determined by calculation, and is hereinafter referred to as "total light transmittance Tt (%)".

Note that the total light transmittance based on JIS K-7361-1 is defined as the proportion of total transmitted light flux with respect to the parallel incoming light flux of the test fragment, and allows the transparencies in the visible light region in colorless plastics to be compared by way of numerical values. According to the present standard, PMMA, PVC, PS, and the like, are cited as resins having high transparency used in applications such as materials for optics and films, the total light transmittance thereof at 2 mm-thickness being described as 92.6%, 87.0% and 89.6%, respectively. In addition, a formed article of high density polyethylene thin film of 30 μm having a total light transmittance of 90.7% is described, allowing to understand that in the case of a formed article of high density polyethylene, high transparency is exhibited when the article is turned into an extremely thin membrane (film). As can be inferred from this as well, no stretch-formed sheet of ultra-high molecular weight polyolefin having excellent transparency has been obtained as relatively thick stretch-formed sheet of 0.2 mm or greater, as is the case with the above other transparent resins.

Note that, the ultra-high molecular weight polyethylene stretch-formed sheet of the present embodiment can be used in a single layer; in addition, it can also be used by layering another film, sheet, and the like, or, coating with a coating material, or the like.

The stretch-formed sheet of ultra-high molecular weight polyolefin of the present embodiment can be used suitably by taking advantage of the properties thereof, for instance, in materials for back lining and surface covering of sliding tape, thrust washer, slide sheet, guide, ski, snowboard and the like; lining materials for hopper, chute and the like; transport pipe/sheet for food materials or the like; covering material for protective shield, fender, roll, pipe, steel pipe and the like; electrical insulation material; resource for agriculture such as greenhouse, member of agricultural machine such as propeller of a machine for agricultural work; and window material for aviation or the like.

EXAMPLE

Hereinafter, synthesis examples, examples and comparative examples will be given to describe the present embodiment in detail; however, the present invention is not limited thereto in particular.

In the examples and comparative examples, measurements of an intrinsic viscosity, α-olefin content, bulk density, melting point, thickness, density, stretch ratio, heat shrinkage rate, internal haze, total light transmittance and tensile property were carried out by the following methods, respectively.

<Intrinsic Viscosity>

In 20 ml of decalin, 20 mg of polymer was introduced and the polymer was dissolved by stirring at 150° C. for two hours. This solution in a high temperature vessel at 135° C., using a Ubbelohde type viscometer, the falling time ($t_s$) between marked lines was measured. Note that the falling time ($t_b$) of decahydro naphthalene alone with no polymer introduced was measured as a blank. Then, according to the following formula, the specific viscosity ($\eta_{sp}/C$) of the polymer was plotted, and the intrinsic viscosity ($\eta$) extrapolated to zero concentration was determined.

$$\eta_{sp}/C = (t_s/t_b - 1)/0.1$$

<α-Olefin Content>

Measurement of the content of α-olefin (mol %) was carried out according to the methods disclosed in Macromolecules, 10,773 (1977) by G. J. Ray, etc., and the signal of methylene carbon observed by way of an $^{13}$C-NMR spectrum was used to calculate the content of α-olefin from the surface area intensity thereof. The instrument used was Lambda-400 manufactured by JEOL. The solvent used was o-orthodichlorobenzene-d4, the measurement temperature was 140° C., the observation wavelength was 100 MHz (13C), the pulse width 45° (7.5 μsec), and the number of integration was 10,000 times. The measurement reference was the PE (-eee-) signal, set to 29.9 ppm.

<Bulk Density>

The bulk density of the polymer of ultra-high molecular weight polyethylene powder was measured according to JIS K-7365.

<Melting Point>

Approximately 8 mg of polymer of ultra-high molecular weight polyethylene sample in powder form was placed and enclosed in an aluminum pan, heated from 50° C. to 180° C. at 10° C./min, kept in this state for 5 minutes, then, the temperature was dropped to 50° C. at a temperature dropping speed of 10° C./min, and reheated to 180° C. at 10° C./min. In so doing, temperature of the endothermic peak accompanying the melting was measured as the melting point.

<Thickness>

The thicknesses of the formed article and stretch-formed sheet were measured using a micrometer (395-541: BMD-25DM) manufactured by Mitsutoyo. Note that the thickness was a value measured to the third decimal and approximated at the third decimal.

<Density>

Was measured according to ASTM D 1505. Note that, in measuring the density of the formed article, a fragment obtained by cutting out from a press sheet described below, was annealed at 120° C. for one hour, then cooled at 25° C. for one hour, and was used as the test fragment. In addition, in measuring the density of the stretch-formed sheet, a fragment obtained by cutting out from a stretch-formed sheet was annealed at 120° C. for one hour, then cooled at 25° C. for one hour, and was used as the test fragment.

<Stretch Ratio>

The dimension in thickness direction of the formed article was measured prior to stretching/after stretching, and based on the above Formula (2), the thickness prior to stretching was subtracted with the thickness after stretching to calculate the stretch ratio. Note that, the dimensional measurements after stretching were carried out subsequently to the stretching step, after leaving the sample at room temperature for 30 minutes.

<Heat Shrinkage Rate>

A 6 mm-wide and 40 mm-long sample in sheet form was cut from the stretch-formed sheet of each example and the final processed product of each comparative example (formed sheet or stretch-formed sheet), this sample in sheet form was placed for 30 minutes in a constant temperature dryer kept at a temperature of 120° C., and then let to cool at room temperature for 30 minutes. The dimensions were measured before and after this state adjustment, and the heat shrinkage rate was calculated based on the above Formula (1). Here, the measurement of the heat shrinkage rate in the MD direction and the TD direction was performed individually in each MD direction and TD direction using individual samples in sheet form.

Note that, for the stretch-formed sheets in which the main MD direction was undetermined, and, for the formed sheets for which no stretch processing was carried out, among the two directions that are perpendicular within the plane of the sheet, the larger heat shrinkage rate served as the value for the MD direction, and the smaller served as the value for the TD direction.

<Internal Haze>

The internal haze was measured according to JIS-K7136, using the stretch-formed sheet of each example and the final processed product of each comparative example (formed sheet or stretch-formed sheet) as test fragments. Here, in order eliminate factors due to external haze, a holder made from quartz glass was filled with ethanol manufactured by Wako Pure Chemical Industries, and test fragment were placed therein to measure the internal haze. For the measurement instrument, Nippon Denshoku Industries Co. Ltd. hazemeter NDH2000 was used. In addition, the internal haze converted to a thickness of 2 mm, was calculated using the already described relationship formula (haze; %)=a×t (thickness of stretch-formed sheet; mm)+b.

<Total Light Transmittance>

The total light transmittance T was measured according to JIS-K7316-1, using the stretch-formed sheet of each example and the final processed product of each comparative example (formed sheet or stretch-formed sheet) as test fragments. For the measurement instrument, Nippon Denshoku Industries Co. Ltd. hazemeter NDH2000 was used. In addition, with a=−9.2 and b=85.0 in the above Formula (3), the total light transmittance Tt corresponding to the right member a×(t)+b was calculated.

<Tensile Property>

The stretch-formed sheet of each example and the final processed product of each comparative example (formed sheet or stretch-formed sheet) were punched out to prepare the JIS No. 2 dumbbell test fragments described in JIS K7113. Using the obtained dumbbell test fragments, tensile test was carried out under the conditions of 50 mm/minute tensile velocity and 23° C. temperature to measure the tensile yield strength and the tensile elongation at break.

Synthesis Example 1

<Synthesis of Solid Catalyst Constituent [A]>

An 8 liter stainless autoclave thoroughly substituted with nitrogen was loaded with 1460 milliliters of a 2 mol/liter trichlorosilane hexane solution, 3730 milliliters of an hexane solution of organomagnesium compound represented by the composition formula $AlMg_5(C_4H_9)_{11}(OC_3H_7)_2$ (magnesium: 2.68 equivalents in mol) was added drop wise over 4 hours while stirring at 80° C., and the reaction was carried on while stirring further at 80° C. for one hour. After reaction termination, the supernatant solution was eliminated and the solid was washed four times with 2600 milliliters of hexane to obtain the (A-1) carrier. This carrier was analyzed, and as a result, the magnesium contained per one gram of solid was 8.43 millimoles.

2880 milliliters of a hexane slurry containing 160 g of the above Carrier (A-1) was prepared, and 160 milliliters of a hexane solution of 1 mol/liter titanium tetrachloride, 160 milliliters of a hexane solution of 1 mol/liter organomagnesium compound represented by the composition formula $AlMg_5(C_4H_9)_{11}(OC_3H_7)_2$ were added simultaneously to this slurry over one hour while stirring at 20° C. After the addition, the reaction was carried on at 20° C. for one hour. After reaction termination, solid catalyst constituent [A] was prepared by eliminating 1600 milliliters of supernatant solution and washing twice with 1600 milliliters of hexane. Contained in one gram of this solid catalyst constituent were titanium in the amount of 0.98 millimoles and chlorine in the amount of 14.9 millimoles.

Example 1

<Synthesis of a Polymer of Ultra-High Molecular Weight Polyolefin>

The above solid catalyst constituent [A], together with hexane, ethylene and 1-butene, was supplied continuously to a vessel type 200 liter polymerization reactor fitted with a jacket to which a stirrer was mounted to carry out synthesis of the polymer. The polymerization temperature was maintained at 68° C. Hexane serving as solvent was supplied at 65 liter/Hr.

More concretely, the above solid catalyst constituent [A] was supplied continuously with a pump so that the polymer production speed was 6 kg/Hr; simultaneously, triisobutyl aluminum, which is the organometallic compound constituent [B], at a tank concentration of 18 millimoles/liter, was supplied at 0.45 liter/hr. In addition, 1-butene was supplied continuously with a pump so that it was 5 mol % in gas phase concentration, and ethylene was supplied continuously so that the polymerization pressure was 0.3 MPa. Then, the polymerization slurry was withdrawn continuously so that the level of the polymerization reactor could be kept constant, and the withdrawn slurry was sent through a solvent separation step, to a drying step. As a result, no aggregated polymer was present, the slurry withdrawal tube did not become obstructed, allowing a continuous operation to be carried out stably. The catalyst activity was 20,000 g PE/g catalyst. The ultra-high molecular weight polyethylene copolymer of Example 1 obtained in this way had an intrinsic viscosity (η) in decalin (135° C.) of 16.9 dl/g and a density of 919 $kg/m^3$.

<Preparation of a Formed Article of Ultra-High Molecular Weight Polyolefin>

Using the ultra-high molecular weight polyethylene copolymer obtained Example 1, a thick formed product in roll form was prepared, this thick formed product was skived to approximately 1 mm to prepare a skive sheet, and this served as the formed article of ultra-high molecular weight polyolefin of Example 1. When the thickness of this skive sheet was measured accurately, the thickness was 0.93 mm. In addition, the density of this skive sheet was 920 $kg/m^3$.

<Preparation of a Stretch-Formed Sheet of Ultra-High Molecular Weight Polyolefin>

After state adjustment was carried out at 80° C. for 30 minutes, the formed article of ultra-high molecular weight polyolefin of Example 1 was repeatedly passed through a gap narrowing in the order 1.0 mm, 0.5 mm, 0.3 mm and 0.1 mm using a rolling mill having a roll diameter of 400 mm and a roll length of 500 mm to prepare a roll sheet, which served as the stretch-formed sheet of ultra-high molecular weight polyolefin of Example 1. In so doing, the temperature of the roll surface was maintained at 80° C. Although the final gap was 0.1 mm, the thickness and density of the obtained stretch-formed sheet were 0.45 mm and 920 kg $m^3$. The internal haze in the thickness direction of this stretch-formed sheet was 23.5% and the total light transmittance T was 87.0%. In addition, the stretch ratio was 2.2 times. Other evaluation results thereof are shown together in Table 1.

Example 2

<Preparation of a Formed Article of Ultra-High Molecular Weight Polyolefin>

Using the ultra-high molecular weight polyethylene copolymer of Example 1, a thick formed product in roll form was prepared, and this thick formed product was skived to approximately 3 mm-thickness to prepare a skive sheet, which served as the formed article of ultra-high molecular weight polyolefin of Example 2. When the thickness of this skive sheet was measured accurately, the thickness was 3.03 mm. In addition, the density of this skive sheet was 924 kg/$m^3$.

<Preparation of a Stretch-Formed Sheet of Ultra-High Molecular Weight Polyolefin>

After state adjustment was carried out at 80° C. for 30 minutes, the formed article of ultra-high molecular weight polyolefin of Example 2 was repeatedly passed through a gap narrowing in the order 1.0 mm, 0.5 mm, 0.3 mm and 0.1 mm using a rolling mill having a roll diameter of 400 mm and a roll length of 500 mm to prepare a roll sheet, which served as the stretch-formed sheet of ultra-high molecular weight polyolefin of Example 2. In so doing, the temperature of the roll surface was maintained at 80° C. Although the final gap was 0.1 mm, the thickness and density of the obtained stretch-formed sheet were 0.84 mm and 920 kg/$m^3$. The internal haze in the thickness direction of this stretch-formed sheet was 6.6% and the total light transmittance T was 85.6%. In addition, the stretch ratio was 3.6 times. Other evaluation results thereof are shown together in Table 1.

Example 3

<Synthesis of a Polymer of Ultra-High Molecular Weight Polyolefin>

Polymerization was carried out by similar methods to Example 1 except that the polymerization temperature was 66° C. As a result, an ultra-high molecular weight polyethylene copolymer of Example 3 was obtained having an intrinsic viscosity (η) of 17.2 dl/g and a density of 919 kg/$m^3$.

<Preparation of a Formed Article of Ultra-High Molecular Weight Polyolefin>

Using the obtained ultra-high molecular weight polyethylene copolymer of Example 3, an approximately 4 mm-thick press sheet was prepared, which served as the stretch-formed sheet of ultra-high molecular weight polyolefin of Example 3. When the thickness of this press sheet was measured accurately, the thickness was 4.05 mm. In addition, the density of this press sheet was 917 kg/$m^3$.

<Preparation of a Stretch-Formed Sheet of Ultra-High Molecular Weight Polyolefin>

After state adjustment was carried out at 80° C. for 30 minutes, the formed article of ultra-high molecular weight polyolefin of Example 3 was repeatedly passed through a gap narrowing in the order 1.0 mm, 0.5 mm, 0.3 mm and 0.1 mm using a rolling mill having a roll diameter of 400 mm and a roll length of 500 mm to prepare a roll sheet, which served as the stretch-formed sheet of ultra-high molecular weight polyolefin of Example 3. In so doing, the temperature of the roll surface was maintained at 80° C. Although the final gap was 0.1 mm, the thickness and density of the obtained stretch-formed sheet were 1.38 mm and 917 kg/$m^3$. The internal haze in the thickness direction of this stretch-formed sheet was 24.3% and the total light transmittance T was 82.7%. In addition, the stretch ratio was 2.9 times. Other evaluation results thereof are shown together in Table 1.

Example 4

<Synthesis of a Polymer of Ultra-High Molecular Weight Polyolefin>

Polymerization was carried out by similar methods to Example 1 except that the polymerization temperature was modified to 70° C. and α-olefin to propylene, and the gas phase concentration of this propylene was 10 molar %. As a result, an ultra-high molecular weight polyethylene copolymer of Example 4 was obtained, having an intrinsic viscosity (η) of 11.9 dl/g, density of 920 kg/$m^3$.

<Preparation of a Formed Article of Ultra-High Molecular Weight Polyolefin>

Using the obtained ultra-high molecular weight polyethylene copolymer of Example 4, an approximately 4 mm-thick press sheet was prepared, which served as the stretch-formed sheet of ultra-high molecular weight polyolefin of Example 4. When the thickness of this press sheet was measured accurately, the thickness was 4.11 mm. In addition, the density of this press sheet was 920 kg/$m^3$.

<Preparation of a Stretch-Formed Sheet of Ultra-High Molecular Weight Polyolefin>

A primary processed product obtained by cutting the formed article of ultra-high molecular weight polyolefin of Example 4 into a 26 mm wide and 115 mm long shape, after a state adjustment at 80° C. for 30 minutes was carried out, was drawn at a tensile velocity of 50 mm/min and a drawing factor of 200% to prepare a draw sheet, which served as the stretch-formed sheet of ultra-high molecular weight polyolefin of Example 4. The width, thickness and density of the obtained stretch-formed sheet were respectively 14.2 mm, 2.54 mm and 920 kg/$m^3$. The internal haze in the thickness direction of this stretch-formed sheet was 41.0% and the total light transmittance T was 81.3%. In addition, stretch ratio was 1.6 times. Other evaluation results thereof are shown together in Table 1.

Example 5

<Preparation of a Formed Article of Ultra-High Molecular Weight Polyolefin>

Using the ultra-high molecular weight polyethylene copolymer of Example 3, an approximately 7 mm-thick press sheet was prepared, which served as the stretch-formed sheet of ultra-high molecular weight polyolefin of Example 5. When the thickness of this press sheet was measured accurately, the thickness was 7.28 mm. In addition, the density of this press sheet was 919 kg/$m^3$.

<Preparation of a Stretch-Formed Sheet of Ultra-High Molecular Weight Polyolefin>

A primary processed product obtained by cutting the formed article of ultra-high molecular weight polyolefin of Example 5 into a 40 mm×40 mm sheet shape, was placed into a 200×200×1 mm mold, pressure compression was carried out sequentially at 50 K/G for 5 minutes and at 150 K/G for 25 minutes under a temperature environment of 100° C., following this pressure compression, the article was transferred to a cooled press, cooled pressure compression was carried out at 150 K/G for 30 minutes running cooling water through the die so that the release temperature was 30° C. or lower to prepare a compression sheet, which served as the stretch-formed sheet of ultra-high molecular weight polyolefin of Example 5. The thickness and density of the obtained stretch-formed sheet were 3.17 mm and 920 kg/m$^3$. The internal haze in the thickness direction of this stretch-formed sheet was 61.4% and the total light transmittance T was 60.0%. In addition, stretch ratio was 2.3 times. Other evaluation results thereof are shown together in Table 1.

Example 6

<Preparation of a Formed Article of Ultra-High Molecular Weight Polyolefin>

Using the ultra-high molecular weight polyethylene copolymer of Example 3, an approximately 4 mm-thick press sheet was prepared, which served as the stretch-formed sheet of ultra-high molecular weight polyolefin of Example 6. When the thickness of this press sheet was measured accurately, the thickness was 4.44 mm. In addition, the density of this press sheet was 919 kg/m$^3$.

<Preparation of a Stretch-Formed Sheet of Ultra-High Molecular Weight Polyolefin>

A primary processed product obtained by cutting the formed article of ultra-high molecular weight polyolefin of Example 6 into a 40 mm×40 mm sheet shape, was placed into a 200×200×1 mm mold, pressure compression was carried out sequentially at 50 K/G for 5 minutes and at 150 K/G for 25 minutes under a temperature environment of 40° C., following this pressure compression, the article was transferred to a cooled press, cooled pressure compression was carried out at 150 K/G for 30 minutes running cooling water through the die so that the release temperature was 30° C. or lower to prepare a compression sheet, which served as the stretch-formed sheet of ultra-high molecular weight polyolefin of Example 6. The thickness and density of the obtained stretch-formed sheet were 3.03 mm and 919 kg/m$^3$. The internal haze in the thickness direction of this stretch-formed sheet was 55.8% and the total light transmittance T was 64.8%. In addition, stretch ratio was 1.5 times. Other evaluation results thereof are shown together in Table 1.

Comparative Example 1

An ultra-high molecular weight homopolyethylene polymeric (Sunfine UH900, manufactured by Asahi Kasei Chemicals; product using a Ziegler catalyst) having an intrinsic viscosity (η) of 15.5 dl/g and a density of 940 kg/m$^3$ was used to prepare a thick formed product in roll form, this thick formed product was skived to a thickness of approximately 1 mm to prepare a skive sheet, which served as the formed article of ultra-high molecular weight polyolefin and formed sheet of Comparative Example 1. When the thickness of this skive sheet was measured accurately, the thickness was 0.93 mm. In addition, the density of this skive sheet was 936 kg/m$^3$, the internal haze in the thickness direction was 98.5% and the total light transmittance T was 65.5%. Other evaluation results thereof are shown together in Table 2.

Comparative Example 2

The ultra-high molecular weight polyethylene copolymer of Example 1 was used to prepare a thick formed product in roll form, this thick formed product was skived to a thickness of approximately 3 mm to prepare a skive sheet, which served as the article and formed sheet of formed ultra-high molecular weight polyolefin of Comparative Example 2. When the thickness of this skive sheet was measured accurately, the thickness was 3.10 mm. In addition, the density of this skive sheet was 925 kg/m$^3$, the internal haze in the thickness direction was 97.7% and the total light transmittance T was 54.3%. Other evaluation results thereof are shown together in Table 2.

Comparative Example 3

Polymerization was carried out by similar methods to Example 1 except that the polymerization temperature was 70° C. and the gas phase concentration of 1-butene was 0.5 mol %. As a result, an ultra-high molecular weight polyethylene copolymer of was Comparative Example 3 obtained having an intrinsic viscosity (η) of 23.7 dl/g and a density of 928 kg/m$^3$.

The obtained ultra-high molecular weight polyethylene copolymer of Comparative Example 3 was used to prepare a press sheet having a thickness of approximately 2 mm, which served as the article and formed stretch-formed sheet of ultra-high molecular weight polyolefin of Comparative Example 3. When the thickness of this press sheet was measured accurately, the thickness was 2.08 mm. In addition, the density of this press sheet was 927 kg/m$^3$, the internal haze in the thickness direction was 88.6% and the total light transmittance T was 61.5%. Other evaluation results thereof are shown together in Table 2.

Comparative Example 4

An ultra-high molecular weight homopolyethylene polymeric (GUR4120, manufactured by Ticona; product not using a Ziegler catalyst) having an intrinsic viscosity (η) of 16.0 dl/g and a density of 934 kg/m$^3$ was used to prepare a press sheet having a thickness of approximately 2 mm, which served as the article and formed sheet of formed ultra-high molecular weight polyolefin of Comparative Example 4. When the thickness of this press sheet was measured accurately, the thickness was 2.31 mm. In addition, the density of this press sheet was 930 kg/m$^3$, the internal haze in the thickness direction was 91.6% and the total light transmittance T was 59.2%. Other evaluation results thereof are shown together in Table 2.

Comparative Example 5

A low density polyethylene polymeric (Suntec LD M2102, manufactured by Asahi Kasei Chemicals; product not using a Ziegler catalyst) having an intrinsic viscosity (η) of 1.8 dl/g and a density of 921 kg/m$^3$ was used to prepare a press sheet having a thickness of approximately 2 mm, which served as the article and formed sheet of formed ultra-high molecular weight polyolefin of Comparative Example 5. When the thickness of this press sheet was measured accurately, the thickness was 1.67 mm. In addition, the density of this press sheet was 921 kg/m$^3$, the internal haze in the thickness direction was 96.0% and the total light transmittance T was 72.2%. Other evaluation results thereof are shown together in Table 2.

Comparative Example 6

After state adjustment was carried out at 80° C. for 30 minutes, the skive sheet of Comparative Example 1 was repeatedly passed through a gap narrowing in the order 1.0 mm, 0.5 mm, 0.3 mm and 0.1 mm using a rolling mill having a roll diameter of 400 mm and a roll length of 500 mm to prepare a roll sheet, which served as the stretch-formed sheet of ultra-high molecular weight polyolefin of Comparative Example 6. In so doing, the temperature of the roll surface was maintained at 80° C. Although the final gap was 0.1 mm, the thickness and density of the obtained stretch-formed sheet were 0.53 mm and 933 kg/$m^3$. The internal haze in the thickness direction of this stretch-formed sheet was 88.8% and the total light transmittance T was 76.2%. In addition, stretch ratio was 1.8 times. Other evaluation results thereof are shown together in Table 2.

Comparative Example 7

Polymerization of a copolymer of ultra-high molecular weight polyethylene was carried out using a metallocene series catalyst according to the conditions described in Example 5 of the Specifications of the International Publication No. WO2004/081064. As a result, a copolymer of ultra-high molecular weight polyolefin of Comparative Example 7 was obtained, having an intrinsic viscosity (η) of 20.7 dl/g and a density of 919 kg/$m^3$.

The obtained polymer of ultra-high molecular weight polyolefin of Comparative Example 7 was used to prepare a press sheet having a thickness of approximately 1.5 mm, which served as the formed article of ultra-high molecular weight polyolefin of Comparative Example 7. When the thickness of this press sheet was measured accurately, the thickness was 1.39 mm. In addition, the density of this press sheet was 918 kg/$m^3$.

When drawing of a primary processed product obtained by cutting the obtained press sheet into a 26 mm wide and 115 mm long sheet shape was attempted after a state adjustment at 110° C. for 15 minutes was carried out with a tensile velocity of 3 mm/min, drawing was not possible due to entanglement being strong, and no stretch-formed sheet could be prepared. Other evaluation results thereof are shown together in Table 2.

Note that the conditions for preparing the press sheet, skive sheet, roll sheet, draw sheet and compression sheet in the examples and comparative examples were as follows.

<Press Sheet>

Press sheets were prepared using dies that were 200 mm vertically, 200 mm horizontally, 4 mm and 7 mm in thickness, according to ISO11542-2 (JIS K6936-2: 1999), and pressing ultra-high molecular weight polyolefin under the following conditions.

First, over a 5 mm-thick smooth iron plate, a 0.1 mm-thick aluminum plate was placed, and a 50 μm-thick polyethylene terephthalate film (PET film; Lumilar, manufactured by Toray) was placed further. The above dies that were 200 mm vertically, 200 mm horizontally, 4 mm and 7 mm in thickness were placed over this PET film, a given amount of ultra-high molecular weight polyethylene powder was placed respectively in the dies and, over this powder, the above polyethylene terephthalate film was placed, the above aluminum plate was further placed, and the above iron plate was further placed.

Then, the above die was placed in a compression molding machine (SFA-37, manufactured by SHINTO Metal Industries Corporation) thermoregulated to 210° C., after heating at 210° C. for 300 seconds, air removal was carried out, and application of pressure was carried out at 100 K/G for 30 minutes. After termination of application of pressure, the sample was removed, and five seconds after removal, was placed in a compression molding machine (SFA-37, manufactured by SHINTO Metal Industries Corporation) thermoregulated to 25° C., was cooled at a cooling speed of 15±2° C./minutes while applying pressure at 100 K/G for 600 seconds at 25° C. The cooling speed was adjusted by sandwiching the die with thick paper. The target press sheet was obtained by removing the sample from the die after cooling.

<Skive Sheet>

An ultra-high molecular weight polyethylene powder was loaded into a hollow donut-shaped die having an external diameter of 600 mmϕ and an internal diameter of 90 mmϕ so that the final thickness was on the order of 130 mm, internal air was let out at approximately 100 K/G for 30 minutes, thereafter, heating was carried out for 13 hours under the conditions of approximately around 90 K/G pressure, and approximately 140 to 145° C. In addition, while the pressure was kept at approximately 90 K/G, cooling was carried out for approximately 7 hours. The donut-shaped formed article removed from the die was left at room temperature for 48 hours, and cooled by further removing the internal heat. Thereafter, the donut-shaped formed article was immobilized onto a skiving machine and skived to a given thickness to obtain the target skive sheet with the given thickness.

<Roll Sheet>

Using a rolling roll having a roll diameter of 400 mmϕ, a roll width of 500 mm and a pressure application capability of 200 t adjusted to a given gap, a formed article prior to stretching having a given thickness preheated to 80° C. was rolled at a speed of 1 m/min, following rolling, left at ordinary temperature for 24 hours to carry out cooling to obtain the target roll sheet.

<Draw Sheet>

A sample obtained by cutting a formed article prior to stretching having a given thickness into a 26 mm wide and 115 mm long sheet shape was left under a temperature of 80° C. for 30 minutes, then, was drawn 200% at a speed of 50 mm/min with a chuck spacing of 50 mm. Thereafter, while still in 200% drawn state, it was left at room temperature for 30 minutes, and shrinkage due to internal stress was removed to obtain the target draw sheet.

<Compression Sheet>

A sample obtained by cutting a formed article prior to stretching having a given thickness into a 40 mm×40 mm size sheet shape was sandwiched between an iron plate and an aluminum plate similarly to the above press molding conditions. However, polyethylene terephthalate film was excluded, as it causes occurrence of wrinkling during compression drawing and shrinkage. This was placed in a 200×200×1 mm mold, and application of pressure was carried at 50 K/G for 5 minutes and 150 KG for 25 minutes at 100° C. After application of pressure, the sample was transferred to a cooling press, cooling was carried out at 150 K/G for 30 minutes, and the sample was removed from the die after cooling to obtain the target compression sheet.

TABLE 1

| (unit) | Example 1 | Example 2 | Example 3 | Example 4 | Example 5 | Example 6 |
|---|---|---|---|---|---|---|
| Raw material polyolefin (co)polymer | UHMWPE | UHMWPE | UHMWPE | UHMWPE | UHMWPE | UHMWPE |
| Catalyst type | Ziegler | Ziegler | Ziegler | Ziegler | Ziegler | Ziegler |
| Intrinsic viscosity (dl/g) | 16.9 | 16.9 | 17.2 | 11.9 | 17.2 | 17.2 |
| Density (kg/$m^3$) | 919 | 919 | 919 | 920 | 919 | 919 |

TABLE 1-continued

| (unit) | Example 1 | Example 2 | Example 3 | Example 4 | Example 5 | Example 6 |
|---|---|---|---|---|---|---|
| α-olefin content (mol %) | 0.4 | 0.4 | 0.4 | 0.6 | 0.4 | 0.4 |
| Bulk density (g/cc) | 0.44 | 0.44 | 0.44 | 0.42 | 0.44 | 0.44 |
| Melting point (° C.) | 138 | 138 | 137 | 134 | 137 | 137 |
| Formed article (prior to stretching) | Skive | Skive | Press | Press | Press | Press |
| Thickness (mm) | 0.93 | 3.03 | 4.05 | 4.11 | 7.28 | 4.44 |
| Density ($kg/m^3$) | 920 | 924 | 917 | 920 | 919 | 919 |
| Stretching method | Rolling | Rolling | Rolling | Drawing | Compression | Compression |
| Stretch ratio (times) | 2.1 | 3.6 | 2.9 | 1.6 | 2.3 | 1.5 |
| Stretch temperature (° C.) | 80 | 80 | 80 | 80 | 100 | 40 |
| Stretch-formed sheet | | | | | | |
| Thickness (mm) | 0.45 | 0.84 | 1.38 | 2.54 | 3.17 | 3.03 |
| Density ($kg/m^3$) | 920 | 920 | 917 | 920 | 920 | 919 |
| Heat shrinkage rate (MD direction) (%) | 21.0 | 39.8 | 40.2 | 47.2 | 22.9 | 14.8 |
| Heat shrinkage rate (TD direction) (%) | −2.6 | −0.7 | −0.9 | −43.6 | 21.4 | 16.1 |
| Internal haze (%) | 23.5 | 6.6 | 24.3 | 41.0 | 61.4 | 64.8 |
| Internal haze converted to 2 mm (%) | 54.9 | 31.6 | 36.3 | 35.0 | 47.5 | 52.6 |
| Total amount of light transmitted (actual measurement value) T (%) | 87.0 | 85.6 | 82.7 | 81.3 | 60.0 | 55.8 |
| Total amount of light transmitted (calculated value) Tt (%) | 80.9 | 77.3 | 72.3 | 61.6 | 55.8 | 57.1 |
| T − Tt (%) | 6.1 | 8.3 | 10.4 | 19.7 | 4.2 | −1.3 |
| Tensile yield strength (Mpa) | 64 | 108 | 87 | 71 | 48 | 42 |
| Tensile elongation at break (between reference lines) (%) | 310 | 69 | 42 | 48 | 457 | 520 |

TABLE 2

| (unit) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Raw material polyolefin (co)polymer | UHMWPE | UHMWPE | UHMWPE | UHMWPE | LDPE | UHMWPE | UHMWPE |
| Catalyst type | Ziegler | Ziegler | Ziegler | — | — | Ziegler | Metallocene |

TABLE 2-continued

| (unit) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Intrinsic viscosity (dl/g) | 15.5 | 16.9 | 23.7 | 16.0 | 1.8 | 15.5 | 20.7 |
| Density (kg/m$^3$) | 940 | 919 | 928 | 934 | 921 | 940 | 919 |
| α-olefin content (mol %) | 0.0 | 0.4 | 0.43 | 0.0 | 0.0 | 0.0 | 0.2 |
| Bulk density (g/cc) | 0.48 | 0.44 | 0.43 | 0.43 | — | 0.48 | 0.24 |
| Melting point (° C.) | 144 | 138 | 144 | 143 | 110 | 144 | 126 |
| Formed article (prior to stretching) | Skive | Skive | Press | Press | Press | Skive | Press |
| Thickness (mm) | 0.93 | 3.10 | 2.08 | 2.31 | 1.67 | 0.93 | 1.39 |
| Density (kg/m$^3$) | 936 | 925 | 927 | 930 | 921 | 936 | 918 |
| Stretching method | None | None | None | None | None | Rolling | Drawing |
| Stretch ratio (times) | 1.0 | 1.0 | 1.0 | 1.0 | 1.0 | 1.8 | Not possible |
| Stretch temperature (° C.) | — | — | — | — | — | 80 | 110 |
| Stretch-formed sheet | | | | | | | — |
| Thickness (mm) | 0.93 | 3.10 | 2.08 | 2.31 | 1.67 | 0.53 | — |
| Density (kg/m$^3$) | 936 | 925 | 927 | 930 | 921 | 933 | — |
| Heat shrinkage rate (MD direction) (%) | 1.7 | 3.6 | 3.2 | 3.1 | 1.1 | 6.2 | — |
| Heat shrinkage rate (TD direction) (%) | −0.9 | 1.9 | 1.7 | 2.2 | 4.9 | 1.9 | — |
| Internal haze (%) | 98.5 | 97.7 | 88.6 | 91.6 | 96.0 | 88.8 | — |
| Internal haze converted to 2 mm (%) | 99.5 | 88.9 | 88.1 | 90.1 | 99.5 | 93.0 | — |
| Total amount of light transmitted (actual measurement value) T (%) | 65.5 | 54.3 | 61.5 | 59.2 | 72.2 | 76.2 | — |
| Total amount of light transmitted (calculated value) Tt (%) | 76.4 | 58.5 | 65.9 | 63.7 | 69.6 | 80.1 | — |
| T − Tt (%) | −10.9 | −2.2 | −4.4 | −4.5 | 2.6 | −3.9 | — |
| Tensile yield strength (Mpa) | 55 | 35 | 38 | 47 | 22 | 81 | — |
| Tensile elongation at break (between | 309 | 435 | 270 | 427 | 750 | 217 | — |

TABLE 2-continued

| (unit) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| reference lines) (%) | | | | | | | |

From the above, the stretch-formed sheets of high molecular weight polyolefin of Examples 1 to 6 were determined to have excellent transparency and mechanic intensity compared to Comparative Examples 1 to 7. In addition, the stretch-formed sheets of high molecular weight polyolefin of Examples 1 to 6 were found to have high tensile yield strength overall, and a tendency to exhibit better transparency compared to the Comparative Examples 1 to 7. In addition, the stretch-formed sheets of high molecular weight polyolefin of Examples 1 to 6, while displaying almost equivalent properties of tensile elongation at break, were shown to have the tendency of having excellent transparency compared to the Comparative Examples 1 to 7.

Taking advantage of the properties thereof, the stretch-formed sheet of ultra-high molecular weight polyolefin and production method of the present invention can be used in various applications as a novel functional material that did not exist in prior art; it can be used suitably in the fields of, for instance, materials for back lining and surface covering of sliding tape, thrust washer, slide sheet, guide, ski, snowboard and the like; lining materials for hopper, chute and the like; transport pipe/sheet for food materials or the like; covering material for protective shield, fender, roll, pipe, steel pipe and the like; electrical insulation material; resource for agriculture such as greenhouse, member of agricultural machine such as propeller of a machine for agricultural work; and window material for aviation or the like.

We claim:

1. A stretch-formed sheet of ultra-high molecular weight polyolefin having a thickness of 0.2 mm or greater and having an internal haze of 70% or less in the direction of the thickness, which is obtained by stretching at least in one direction a formed article of ultra-high molecular weight olefin having a density of 925 kg/$m^3$ or less and containing a polymer of ultra-high molecular weight polyolefin having an intrinsic viscosity of 7 dl/g or greater as measured in a 135° C. decalin solution.

2. The stretch-formed sheet of ultra-high molecular weight polyolefin according to claim 1, wherein the heat shrinkage rate (γ) represented by the following Formula (1) is 5% or greater in at least one of a direction MD along which stretching is carried out and a direction TD perpendicular to the stretching direction:

$$\gamma(\%)=100\times(L0-L)/L0 \qquad \text{Formula (1)}$$

γ: heat shrinkage rate

L0: initial length of stretch-formed sheet

L: length of stretch-formed sheet after state adjustment at 120° C. for 30 minutes.

3. The stretch-formed sheet of ultra-high molecular weight polyolefin according to claim 1, wherein the polymer of ultra-high molecular weight polyolefin comprises a copolymer of ethylene and α-olefin having 3 to 10 carbons.

4. The stretch-formed sheet of ultra-high molecular weight polyolefin according to claim 3, wherein the polymer of ultra-high molecular weight polyolefin has a content of the α-olefin of 0.01 mol % or greater but less than 1 mol %.

5. The stretch-formed sheet of ultra-high molecular weight polyolefin according to claim 1, wherein the internal haze is 70% or less in the thickness direction when converted to a thickness of 2 mm.

6. The stretch-formed sheet of ultra-high molecular weight polyolefin according to claim 1, which is obtainable by stretching the formed article of ultra-high molecular weight polyolefin by a stretch ratio (χ) of 1.3-times or greater represented by the following Formula (2):

$$\chi=t1/t2 \qquad \text{Formula (2)}$$

t1: thickness prior to stretching (mm)

t2: thickness after stretching (mm).

7. A production method of a stretch-formed sheet of ultra-high molecular weight polyolefin, comprising:

a step of preparing a formed article of ultra-high molecular weight polyolefin having a density of 925 kg/$m^3$ or less and containing a polymer of ultra-high molecular weight polyolefin having an intrinsic viscosity of 7 dl/g or greater as measured in a 135° C. decalin solution; and a step of stretching the formed article of ultra-high molecular weight polyolefin in at least one direction at a temperature of less than the melting point (Tm) of the ultra-high molecular weight polyolefin and at ordinary temperature or higher, to prepare a stretch-formed sheet having a thickness of 0.2 mm or greater and an internal haze of 70% or less in the direction of the thickness.

8. The production method of a stretch-formed sheet of ultra-high molecular weight polyolefin according to claim 7, wherein the formed article of ultra-high molecular weight polyolefin is stretched by any means among, rolling, drawing and compression.

9. The production method of a stretch-formed sheet of ultra-high molecular weight polyolefin according to claim 7, wherein the formed article of ultra-high molecular weight polyolefin is stretched by rolling.

10. The production method of a stretch-formed sheet of ultra-high molecular weight polyolefin according to claim 7, wherein the formed article of ultra-high molecular weight polyolefin is stretched by a stretch ratio (χ) of 1.3-times or greater represented by the following Formula (2):

$$\chi=t1/t2 \qquad \text{Formula (2)}$$

t1: thickness prior to stretching (mm)

t2: thickness after stretching (mm).

11. A stretch-formed sheet of ultra-high molecular weight polyolefin, containing a polymer of ultra-high molecular weight polyolefin having an intrinsic viscosity of 7 dl/g or greater as measured in a 135° C. decalin solution which comprises a copolymer of ethylene and α-olefin having 3 to 10 carbons, and having a content of the α-olefin of 0.01 mol % or greater but less than 1 mol %, having a thickness of 0.2 mm or greater, having an internal haze of 70% or less in the thickness direction, and having a heat shrinkage rate (γ) represented by the following Formula (1) of 5% or greater in one of a direction MD along which stretching is carried out and a direction TD perpendicular to the stretching direction:

$$\gamma(\%)=100\times(L0-L)/L0 \quad \text{Formula (1)}$$

γ: heat shrinkage rate

L0: initial length of stretch-formed sheet

L: length of stretch-formed sheet after state adjustment at 120° C. for 30 minutes.

12. The stretch-formed sheet of ultra-high molecular weight polyolefin according to claim 1, wherein the polymer of ultra-high molecular weight polyolefin has an intrinsic viscosity of less than 30 dl/g as measured in a 135° C. decalin solution.

13. The production method of a stretch-formed sheet of ultra-high molecular weight polyolefin according to claim 7, wherein the polymer of ultra-high molecular weight polyolefin has an intrinsic viscosity of less than 30 dl/g as measured in a 135° C. decalin solution.

14. The stretch-formed sheet of ultra-high molecular weight polyolefin according to claim 11, wherein the polymer of ultra-high molecular weight polyolefin has an intrinsic viscosity of less than 30 dl/g as measured in a 135° C. decalin solution.

* * * * *